US009999969B1

(12) United States Patent
Walter

(10) Patent No.: US 9,999,969 B1
(45) Date of Patent: Jun. 19, 2018

(54) DRILL ATTACHMENT WITH DRIVE ASSEMBLY

(71) Applicant: Thomas A. Walter, Cologne, MN (US)

(72) Inventor: Thomas A. Walter, Cologne, MN (US)

(73) Assignee: Clam Corporation, Rogers, MN (US)

( * ) Notice: Subject to any disclaimer, the term of this patent is extended or adjusted under 35 U.S.C. 154(b) by 246 days.

(21) Appl. No.: 14/946,357

(22) Filed: Nov. 19, 2015

Related U.S. Application Data

(63) Continuation-in-part of application No. 13/894,911, filed on May 15, 2013, now Pat. No. 9,561,546.

(60) Provisional application No. 62/091,222, filed on Dec. 12, 2014.

(51) Int. Cl.

*B23B 45/00* (2006.01)
*B25F 5/00* (2006.01)
*B01F 7/00* (2006.01)

(52) U.S. Cl.

CPC .......... *B25F 5/001* (2013.01); *B01F 7/00725* (2013.01)

(58) Field of Classification Search

CPC ... B25B 13/481; B25B 23/0035; B25D 17/04; B25G 1/005
USPC ................................ 173/1–2, 213, 170–171
See application file for complete search history.

(56) References Cited

U.S. PATENT DOCUMENTS 1,575,146 A 3/1926 Brown
2,405,110 A * 8/1946 Bullock ............... B25H 1/0035 173/141
2,947,204 A 8/1960 Pine et al.
2,975,848 A 3/1961 Roberts
3,032,126 A 5/1962 Rexine
3,705,632 A * 12/1972 Burke ..................... E21B 7/008 173/27
3,949,817 A 4/1976 Rice
3,985,188 A 10/1976 Steele
4,077,480 A * 3/1978 Carlson ................. E21B 19/087 173/185
4,280,578 A * 7/1981 Perkins .................... A61H 3/04 180/19.3
4,284,373 A 8/1981 Wolff
4,317,282 A * 3/1982 Pace .................... A01D 34/412 173/170
4,511,004 A 4/1985 Deneem
4,582,456 A * 4/1986 Imai ..................... B25H 1/0042 408/136
4,736,804 A 4/1988 Geibel
(Continued)

OTHER PUBLICATIONS

Bass Pro Shop, "Eskimo® Shark Z71 Quantum 10" Power Ice Auger," BPS Direct, LLC., 3 pages, 2013. http://www.basspro.com/Eskimo-Shark-Z71-Quantum-10-Power-Ice-Auger/product.
(Continued)

*Primary Examiner* — Robert Long
(74) *Attorney, Agent, or Firm* — Cook Alex Ltd.

(57) ABSTRACT

Disclosed are drill assembly attachments having a handle, a drill mount, and a throttle. The throttle is positioned with respect to the drill mount and the handle such that a first portion may be actuated by a user with a hand that is grasping the handle. The drill assembly attachment receives a power drill assembly such that the throttle adjustably engages a trigger of the drill assembly. The drill assembly attachment receives a rotatable device, such as an auger or other tool. Also disclosed is a method of using a power drill assembly and the drill assembly attachment.

30 Claims, 27 Drawing Sheets

(56) References Cited

U.S. PATENT DOCUMENTS 4,818,155 A * 4/1989 Belknap ............... B25H 1/0035 173/36
5,322,397 A * 6/1994 Spear ................... B25H 1/0035 173/36
5,358,062 A * 10/1994 Uhl ......................... E21B 3/035 173/178
5,361,851 A 11/1994 Fox
5,458,602 A * 10/1995 Goble ................ A61B 17/1714 606/96
5,509,489 A * 4/1996 Lower, Jr. ................ B21J 15/38 173/170
5,598,892 A 2/1997 Fox
5,598,893 A 2/1997 Carlson
5,797,708 A * 8/1998 Bencic .................. B23B 47/281 408/103
5,839,612 A * 11/1998 Burke ................. B05C 17/0103 222/333
6,021,854 A * 2/2000 Scarola ................... B25F 5/021 173/141
6,076,617 A 6/2000 Berner
6,125,951 A 10/2000 Bowser
6,315,059 B1 * 11/2001 Geldean .................. E21B 7/028 173/112
6,598,775 B1 7/2003 Chen
6,626,250 B1 9/2003 Ham
6,755,597 B2 7/2004 Bergner et al.
7,140,456 B2 11/2006 Maki
7,226,058 B2 6/2007 Bouchard
7,228,917 B2 * 6/2007 Davis ........................ B25C 7/00 16/114.1
7,237,707 B1 7/2007 Wakelin et al.
7,503,732 B2 * 3/2009 Byrd .................... B25H 1/0078 408/115 R
7,513,404 B2 4/2009 Shkolnikov et al.
7,588,109 B2 * 9/2009 Wachendorf ............. B62M 6/60 180/202
7,617,885 B2 11/2009 Howland
7,677,336 B2 * 3/2010 Gent ....................... E21B 7/005 175/323
7,874,303 B2 1/2011 Xie
7,900,420 B2 * 3/2011 Pope ....................... E04F 21/20 173/13
7,989,718 B1 * 8/2011 Weber ..................... B23B 39/10 200/310
8,074,348 B2 * 12/2011 Haytayan .............. B25B 21/002 29/432
8,162,074 B2 * 4/2012 Cook .................... B23B 45/001 16/114.1
8,544,910 B1 * 10/2013 Weist ....................... A01B 1/22 294/49
8,584,907 B2 * 11/2013 Schneider ........... B05C 17/0103 173/170
9,452,514 B2 * 9/2016 Guthrie ................. B25B 21/002
9,561,546 B1 * 2/2017 Walter .................... B23B 39/00
2004/0191016 A1 * 9/2004 Hintze .................. B23B 49/008 408/67
2004/0240954 A1 12/2004 Chilcott
2005/0000736 A1 1/2005 Maki
2005/0205298 A1 9/2005 Kollasch et al.
2006/0011358 A1 1/2006 Motosko
2006/0048974 A1 * 3/2006 Klaiber ................... E21B 12/00 175/394
2006/0062632 A1 3/2006 Jang
2006/0088392 A1 * 4/2006 Ciurej ................... B23B 39/167 408/53
2006/0169492 A1 8/2006 Kowalewski
2006/0254818 A1 11/2006 Pepple
2009/0084567 A1 * 4/2009 Basham .................... B25C 7/00 173/29
2009/0151530 A1 * 6/2009 Brady .................. B23D 45/003 83/483
2010/0019014 A1 1/2010 Rodenhouse
2010/0074702 A1 3/2010 Kluge
2011/0100652 A1 5/2011 Motosko
2012/0318577 A1 12/2012 Ruppel et al.
2013/0020105 A1 * 1/2013 Cook ...................... B25F 5/026 173/170
2013/0112447 A1 * 5/2013 Rohrer, Jr. .............. E04H 17/26 173/90
2014/0174824 A1 6/2014 Schamberger et al.
2015/0343617 A1 * 12/2015 Kondo .................... B25B 21/02 173/93
2017/0333056 A1 * 11/2017 Ponzer ................... A61B 17/17

OTHER PUBLICATIONS

Bass Pro Shop, “Jiffy® STX™ Pro II Power Ice Auger,” BPS Direct, LLC., 3 pages, 2013. http://www.basspro.com/Jiffy-STX-Pro-II-Power-Ice-Auger/product.
Bass Pro Shop, “StrikeMaster® Magnum™ Power Ice Augers—MP 825 and MP 1025,” BPS Direct, LLC., 3 pages, 2013. http://www.basspro.com/StrikeMaster-Magnum-Power-Ice-Augers.
FishUSA Inc., “Ice Master Ice Auger/Power Drill Conversion Kits,” 2 pages, Printed Sep. 3, 2013. http://www.fishusa.com/Product/Ice-Master-Ice-Auger-Power-Drill-Conversion-Kit.
Hhogenerators, “Eskimo Ice Auger Adapter for Cordless Drill Ice Fishing,” Ebay, 3 pages, printed Sep. 3, 2013. http://www.ebay.com/itm/Eskimo-Ice-Auger-Adapter.
The Sportsman’s Guide, Inc., “Cut Ice Fishing Holes Effortlessly with the Nimrod Ice Auger Adapter and Smart Handle,” 2 pgs, printed Sep. 3, 2013. http://www.sportsmansguide.com.
Vexilarinc, “Electric Drill Ice Augers,” Vexilar Inc., video, printout 3 pages, posted Dec. 11, 2009. http://www.youtube.com/watch?v=3lUxUEE778w.

* cited by examiner

Figure 25
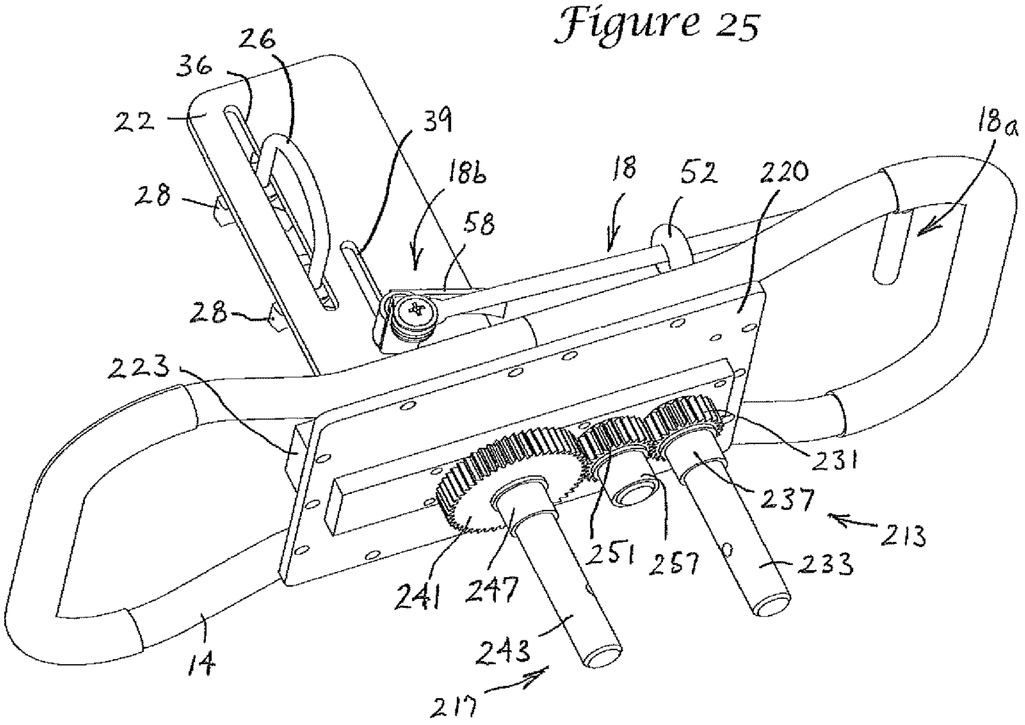
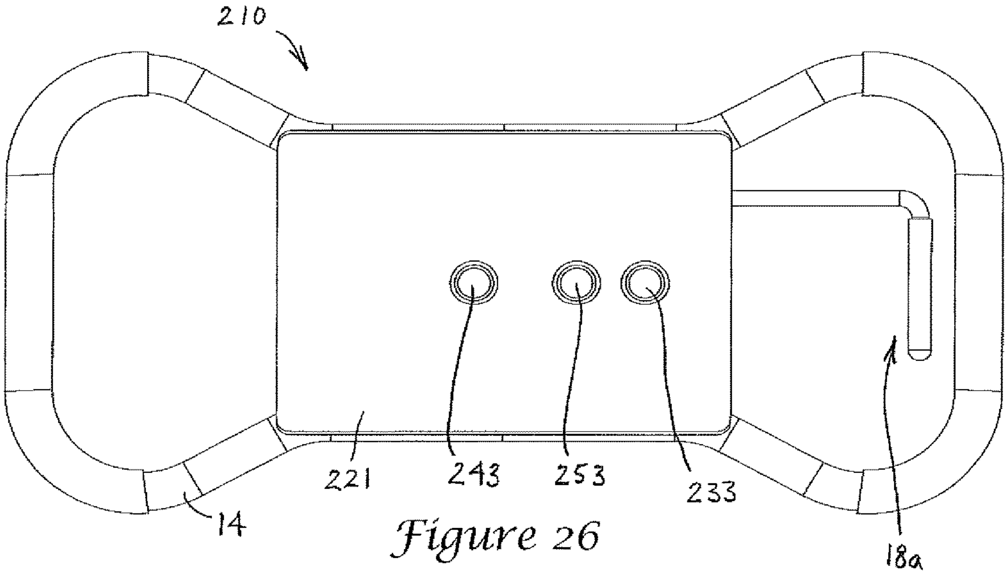
Figure 26

TEST DATA SUMMARY

| Ref # | Diameter | Type | Test | Min | Max | Ave | SD | Pooled Ave | Pooled SD | Pooled Ave+SD | Pooled Time [sec] |
|---|---|---|---|---|---|---|---|---|---|---|---|
| 1 | 6" | Hand | 1 | 5.37 | 14.69 | 10.13 | 1.35 | | | | |
| 2 | 6" | Hand | 2 | 4.73 | 14.91 | 9.86 | 1.48 | 9.97 | 1.43 | 11.40 | 5.92 |
| 3 | 6" | Hand | 3 | 4.96 | 15.02 | 9.92 | 1.46 | | | | |
| 4 | – | – | – | – | – | – | – | | | | |
| 5 | 8" | Hand | 2 | 10.14 | 19.46 | 14.85 | 1.41 | 15.21 | 1.45 | 16.66 | 6.93 |
| 6 | 8" | Hand | 3 | 10.35 | 21.53 | 15.56 | 1.49 | | | | |
| 7 | 8" | Power | 1 | 11.47 | 20.25 | 15.89 | 1.42 | | | | |
| 8 | 8" | Power | 2 | 1.51 | 41.05 | 15.16 | 4.94 | 15.71 | 5.51 | 21.22 | 6.91 |
| 9 | 8" | Power | 3 | 0.52 | 82.25 | 16.10 | 10.16 | | | | |
| 10 | 10" | Power | 1 | 7.11 | 33.63 | 19.96 | 4.02 | | | | |
| 11 | 10" | Power | 2 | 5.99 | 40.45 | 19.67 | 4.59 | 23.33 | 4.42 | 27.75 | 10.09 |
| 12 | 10" | Power | 3 | 14.27 | 43.92 | 30.36 | 4.65 | | | | |
| 13 | 8" | Chipper | 1 | 1.00 | 30.86 | 26.19 | 8.31 | | | | |
| 14 | 8" | Chipper | 2 | 11.74 | 49.22 | 27.95 | 4.78 | 22.27 | 6.34 | 28.61 | 10.39 |
| 15 | 8" | Chipper | 3 | -2.63 | 32.28 | 12.67 | 5.94 | | | | |

DRILL ATTACHMENT WITH DRIVE ASSEMBLY

RELATED APPLICATIONS

This application is a continuation-in-part of U.S. patent application Ser. No. 13/894,911, filed on May 15, 2013, and claims priority of U.S. Patent Application Ser. No. 62/091,222, filed on Dec. 12, 2014, both of which applications are hereby incorporated by reference in their entirety for all purposes.

TECHNICAL FIELD

This disclosure is directed to drill attachments and more particularly, this disclosure is directed to power drill attachments for operating a power drill.

BACKGROUND

Auger assemblies are used to transport and convey materials, including, but not limited to particulate materials, grains, fibers, dirt, water, snow, and ice particles to desired locations. Conventional auger assemblies typically have elongated shafts with continuous helical flights fixed to the shafts. In some cases, auger assemblies may be manually rotated and in other cases, auger assemblies may have a power transmission or may otherwise be operated with a motor.

SUMMARY

This disclosure is directed to several alternative or complementary designs of, materials of, and methods of using drill attachments for operating a drill assembly when the drill assembly is connected to an auger or other device.

Accordingly, one illustrative instance of the disclosure may include a drill assembly attachment including a handle, a drill mount connected to the handle, and a throttle connected to the drill mount and/or the handle. The drill mount may be capable of receiving a drill assembly such that the throttle interacts with a trigger of the drill assembly. In one instance, the drill assembly attachment may include a chuck, where the chuck may replace the standard keyless or keyed chuck of a drill assembly and be received in an opening in the drill mount, and may be connectable to one or more of an auger or other device (e.g., a digger, a mixing tool, or other rotating device) and the drill assembly. In other instances, the drill mount may include an input shaft or drive shaft that includes a portion to be gripped by a standard keyless or keyed chuck of a drill assembly. To prevent undesirable rotation between the drill assembly and the input shaft, the portion of the input shaft to be gripped may have a non-cylindrical shape, such as a hexagonal cross section or the like.

In some instances, this disclosure includes a drill assembly attachment configured to receive a drill assembly, where the drill assembly attachment may include a mounting member, a handle, and throttle. The mounting member may have a first portion and a second portion, the handle may extend from the mounting member, and the throttle may be in adjustable communication with one or more of the mounting member and the handle. The throttle may have a user engaging portion and a trigger engaging portion in communication with the user engaging portion. In some cases, when the user engaging portion is linearly adjusted or otherwise actuated, the trigger engaging portion may be rotationally adjusted or otherwise actuated in response to the movement of the user engaging portion.

Thus, in a one aspect, the disclosure provides a drill assembly attachment that includes a drill mount and a drive assembly connected to a handle, the drill mount configured to receive a drill assembly, the drive assembly further including an input mechanism and an output mechanism in operative communication with the input mechanism, a throttle that is movable with respect to one or more of the drill mount and the handle, and wherein the throttle has a user engaging portion and a trigger engaging portion.

In some instances, the drill assembly attachment of this disclosure may be used in a method. The method may include inserting a first portion of a drill into an opening of a first portion of a mounting member of a drill assembly attachment and connecting a second portion of the drill to a second portion of the mounting member, where a trigger of the drill may be engaged with an adjustable throttle of the drill assembly attachment. In some cases, a user may grasp a first portion of a handle of the drill assembly attachment and grasp a second portion of the handle while grasping the first portion of the handle. While grasping the handle or at any other time and/or position, a first portion of the adjustable throttle may be linearly adjusted by the user to engage the trigger of the drill assembly, such as by rotating a second portion of the adjustable throttle in to engagement with the trigger.

Accordingly, in another aspect, the disclosure provides a method of using a power drill assembly with a drill assembly attachment, the drill assembly attachment having a mounting member, a handle extending from the mounting member, an adjustable throttle, a drive assembly having an input mechanism and an output mechanism in operative communication with the input mechanism. The method includes connecting a first portion of a power drill assembly to the input mechanism, connecting a second portion of the power drill assembly to the mounting member of the drill assembly attachment, and engaging the adjustable throttle of the drill assembly attachment with a trigger of the power drill assembly to rotate the input mechanism and effect rotation of the output mechanism.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 25 is a schematic perspective view from below of the illustrative power drill assembly attachment of FIG. 21, with the drive box base removed;

FIG. 26 is a schematic bottom view of the illustrative power drill assembly attachment of FIG. 21;

Figure 1:
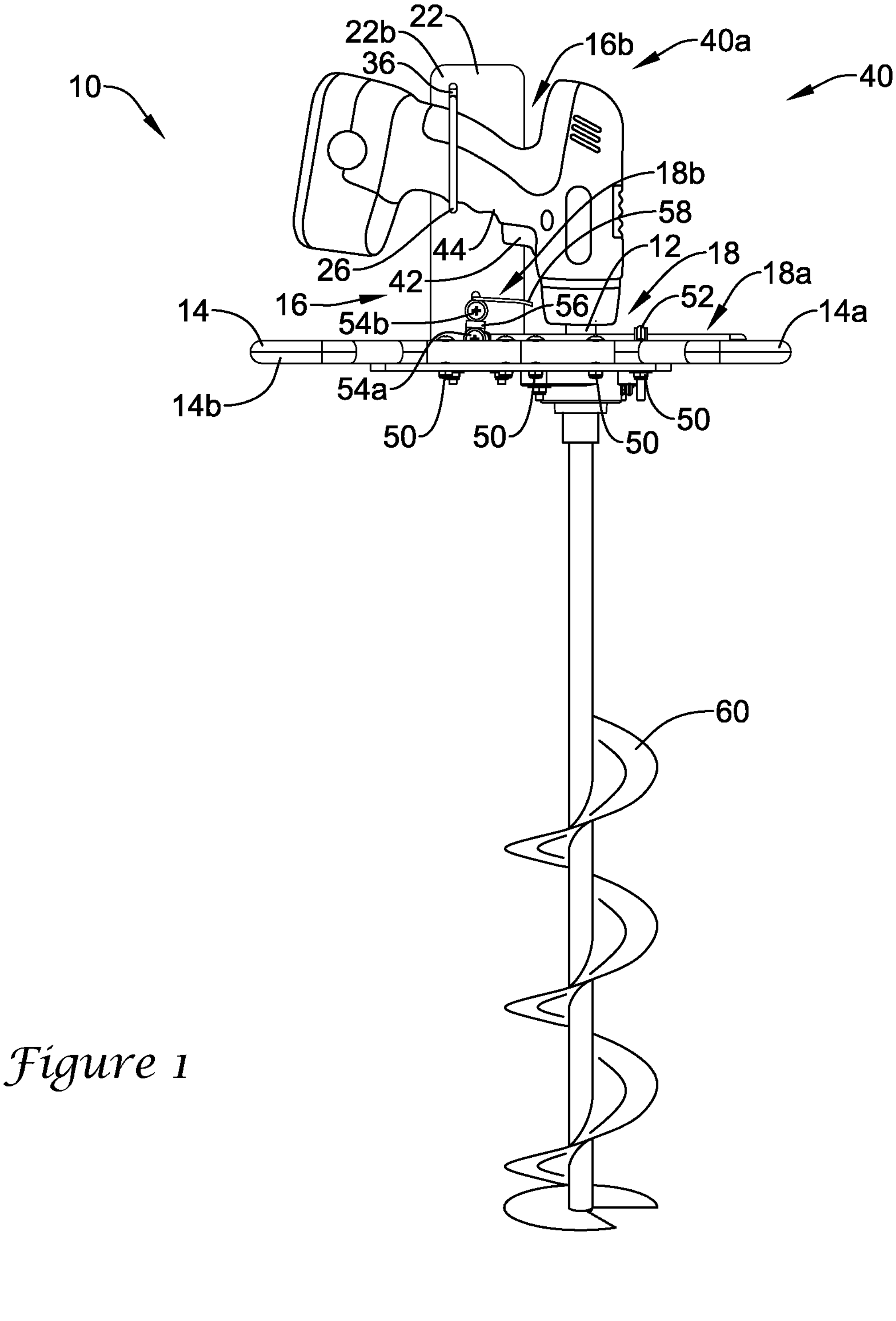
FIG. 1 is a schematic side view of a first example illustrative power drill assembly attachment, an illustrative power drill assembly, and an illustrative rotatable device.

While the disclosure is amenable to various modifications and alternative forms, specifics thereof have been shown by way of example in the drawings and will be described in detail. It should be understood, however, that the intention is not to limit aspects of the claimed disclosure to the particular embodiments described. On the contrary, the intention is to cover all modifications, equivalents, and alternatives falling within the spirit and scope of the claimed disclosure.

DETAILED DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure.

The recitation of numerical ranges by endpoints includes all numbers within that range (e.g., 1 to 5 includes 1, 1.5, 2, 2.75, 3, 3.80, 4, and 5).

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the claimed disclosure. The illustrative embodiments depicted are intended only as exemplary. Selected features of any illustrative embodiment may be incorporated into an additional embodiment unless clearly stated to the contrary.

Generally, as described herein and depicted in FIGS. 1-10, a first example drill assembly attachment 10 may be a tool and/or one or more attachment pieces that may be used with a power drill (e.g., a hand-held corded or cordless power drill or other power drill) or other drill mechanism, referred to generally herein as a drill assembly 40. In some instances, the drill assembly attachment 10 may have a chuck 12 (alternatively, the chuck 12 may be separate from the drill assembly attachment 10) that is able to and/or is configured to connect an auger 60 or other rotatable device (e.g., a mixer, other rotatable digger, etc.) with a power drill assembly 40. The chuck 12 may be configured to rotate within the drill assembly attachment 10, but may otherwise be substantially adjustably fixed (e.g., axially fixed) within and/or with respect to the drill assembly attachment 10, as further described below. The auger 60 or other rotatable device may be any typical auger of any typical size and shape that is capable of attaching to at least one of the chuck 12, the drill assembly attachment 10, the drill assembly 40, or other feature.

As shown in FIGS. 1-10, the drill assembly attachment 10 of the first example may include a handle 14, a mounting member or a drill mount 16 connected to the handle 14, and a throttle 18 connected to the drill mount 16. In some instances, the mounting member or drill mount 16 may receive a drill assembly 40 and may engage the drill assembly 40 in a position with respect to the handle 14 and/or the throttle 18. Alternatively, or in addition, the drill mount 16 may be capable of receiving the drill assembly 40 such that the throttle 18 may adjustably interact with a trigger 42 of the drill assembly 40.

Illustratively, the mounting member or drill mount 16 of the drill assembly attachment 10 may have a first portion 16*a* and a second portion 16*b*. In some instances, the mounting member or drill mount 16 may include one or more of a base plate 20 connected to or otherwise extending from the handle 14, a side plate 22 connected to and/or extending from the base plate 20, one or more brackets 26, one or more bracket connectors 28, a bearing assembly 30, and any other feature, as desired. In some instances, the second portion 16*b* of the mounting member or drill mount 16 may include the side plate 22 of the drill mount 16 and the side plate 22 may be positioned on or about (e.g., extending from, connected to, etc.) the first portion 16*a* including the base plate 20. The first portion 16*a* and the second portion 16*b* of the mounting member or drill mount 16 may be oriented such that a handle 44 of a drill assembly 40 received in the drill assembly attachment 10 may be positioned adjacent the side plate 22, as shown in FIG. 1.

The mounting member or drill mount 16 may be made from any material in any manner, as desired. For example, the mounting member or drill mount 16 may be made from a metal, a polymer, a composite material, or other material at least capable of structurally withstanding forces from a user and/or a drill assembly 40 while the user operates the drill assembly 40 with the drill assembly attachment 10 connected to the drill assembly 40.

Figure 2:
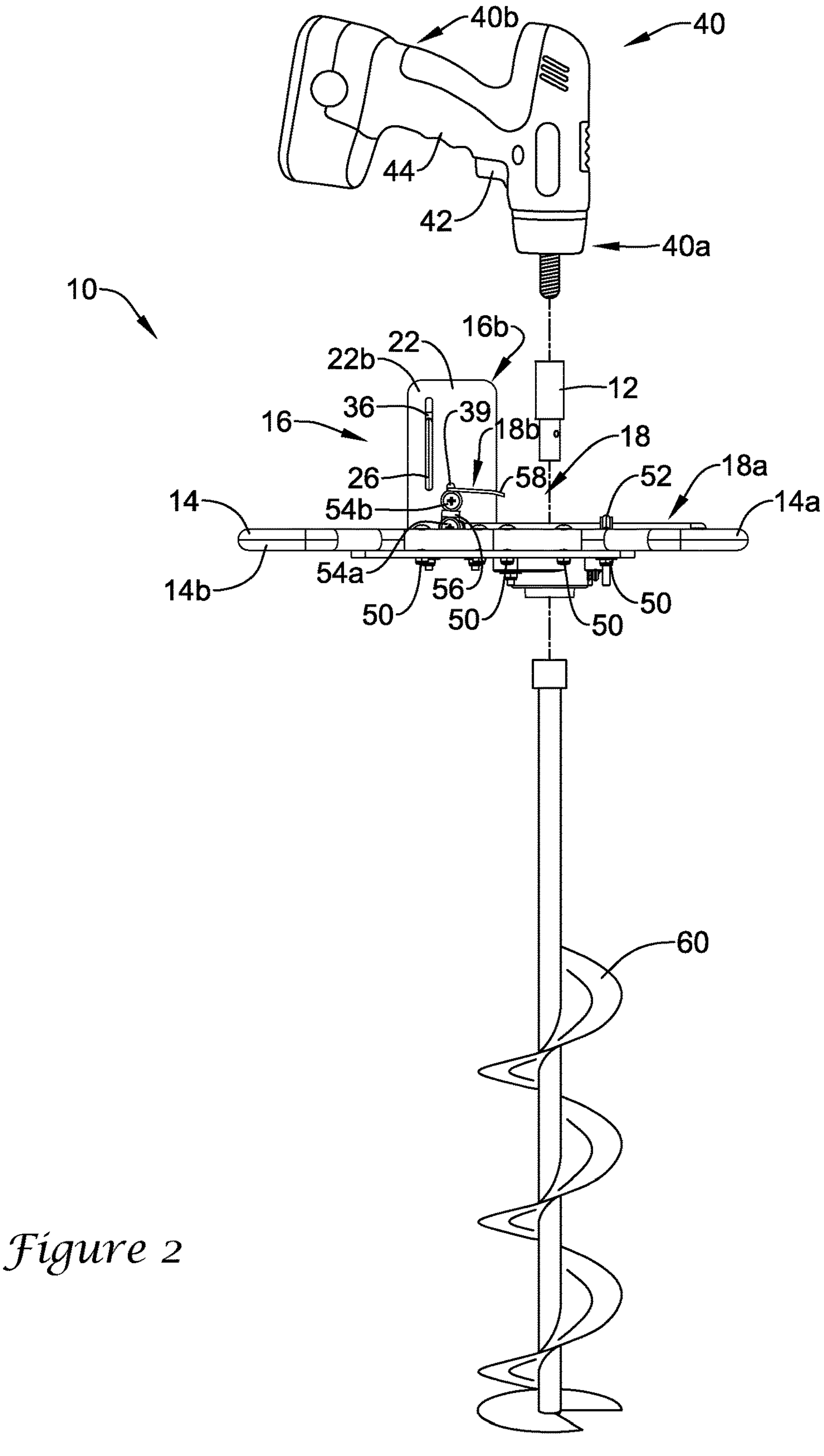
FIG. 2 is a schematic partially exploded side view of the illustrative power drill assembly attachment, the illustrative power drill assembly, and the illustrative rotatable device of FIG. 1.
Figure 3:
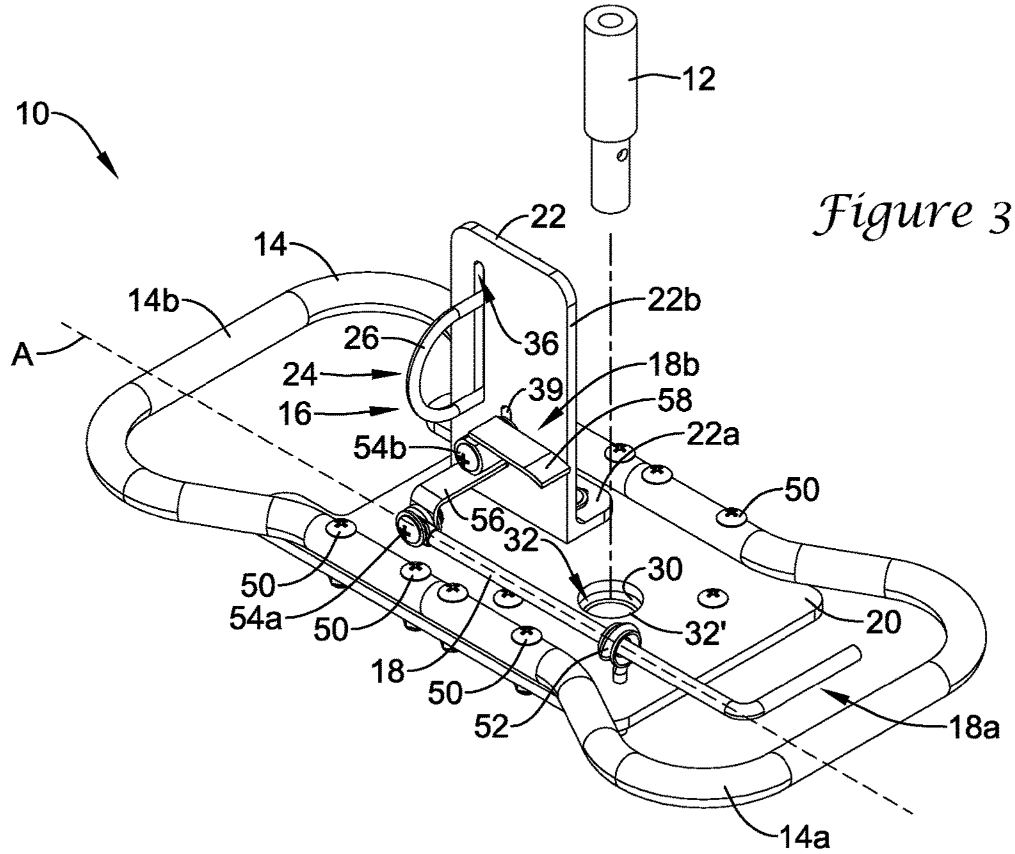
FIG. 3 is a schematic perspective view from above of the illustrative power drill assembly attachment of FIG. 1.

A chuck 12 that may be connected to (e.g., via a threaded engagement, pin-lock, or other connection type) the drill assembly 40 received in the drill assembly attachment 10 may be received in and/or through an opening 32 in the base plate 20, as shown in FIGS. 1-3. In some instances, the chuck 12 and/or the drill assembly 40 may abut a ledge 32' of the base plate 20 or a ledge of the bearing assembly 30 forming or adjacent to the opening 32 to ensure the chuck 12 cannot freely pass through the opening 32. Alternatively, or in addition, one or more set screws 38 or other connectors may engage the chuck 12 to axially fix the chuck 12 within the opening 32 of the base plate 20.

As shown in the Figures, the side plate 22 and base plate 20 may include two separate portions that are connected by adjustable features (e.g., adjustable threaded members, nuts and/or bolts, other adjustable members configured to mate, etc.). Even so, and while they are referred to as the side plate 22 and base plate 20, it is contemplated that may be constructed as structural members that are not made from traditional plate materials, such as hollow structures or the like. It is further contemplated that they may be connected in a non-adjustable manner, may be connected in a permanent manner (e.g., the side plate 22 may be connected to the base plate 20 with a weld connection or other similar connection, such that the side plate 22 may not be separable from the base plate 20 without mechanically or otherwise altering one or both of the base plate 20 and the side plate 22), and/or may be unitarily constructed (e.g., with a molding process, a mechanical bending process and/or any other desirable manufacturing process).

Figure 5:
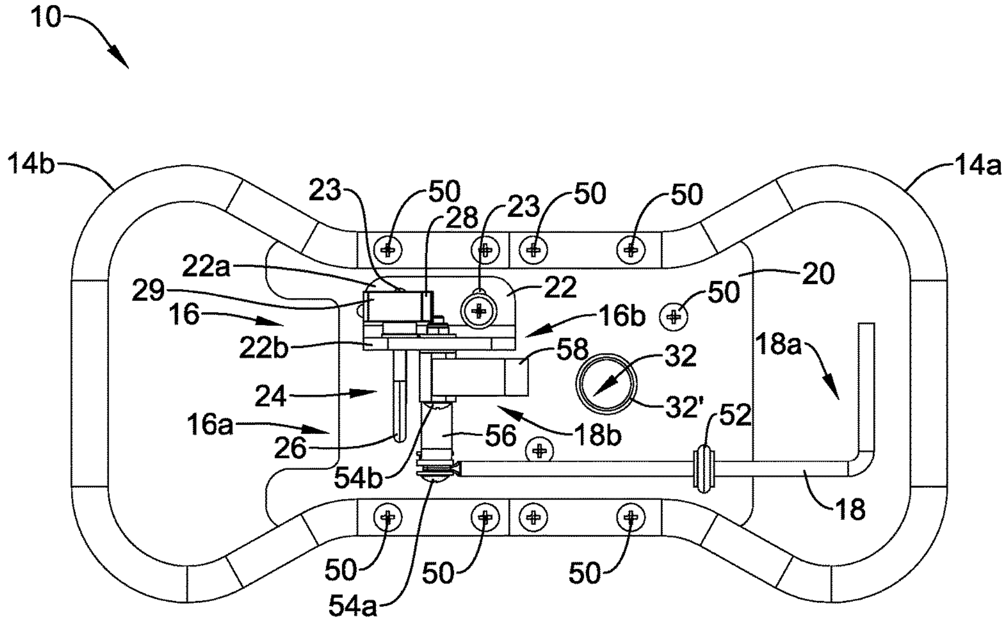
FIG. 5 is a schematic top view of the illustrative power drill assembly attachment of FIG. 1.

In one example, where the side plate 22 and the base plate 20 may be separate portions, the side plate 22 may have an "L" shape, as shown in FIGS. 3 and 5. The L-shaped side plate 22 may have a first part 22*a* that may be positioned to adjustably abut and/or connect to the base plate 20 and a second part 22*b* extending from the first part 22*a*. The second part 22*b* of the side plate 22 may extend from the first part 22*a* at any angle. For example, the second part 22*b* may extend at substantially ninety (90) degrees from the first part 22*a* of the side plate 22.

Illustratively, the first part 22*a* of the side plate 22 may be connected to the base plate 20 in any manner. For example, assembly connectors 50 may connect the first part 22*a* to the base plate 20 by extending through an opening 23 in the first part 22*a* and through an opening 21 in the base plate 20. The openings 21 in the base plate 20 and the openings 23 in the first part 22*a* of the side plate 22 may be elongated (e.g., the openings 23 in the first part 22*a* of the side plate 22 may be elongated in a direction substantially perpendicular to the elongated direction of the openings 21 in the base plate 20) or may have a different shape to allow the position of the first part 22*a* of the side plate 22 to be adjusted with respect to the base plate 20, as desired. Alternatively, or in addition, the first part 22*a* of the side plate 22 may be connected to the base plate 20 in a fixed manner and/or permanent manner.

Alternatively, or in addition, any type of connector or connection technique may be used to effect a connection between the side plate 22 and the base plate 20.

Figure 11:
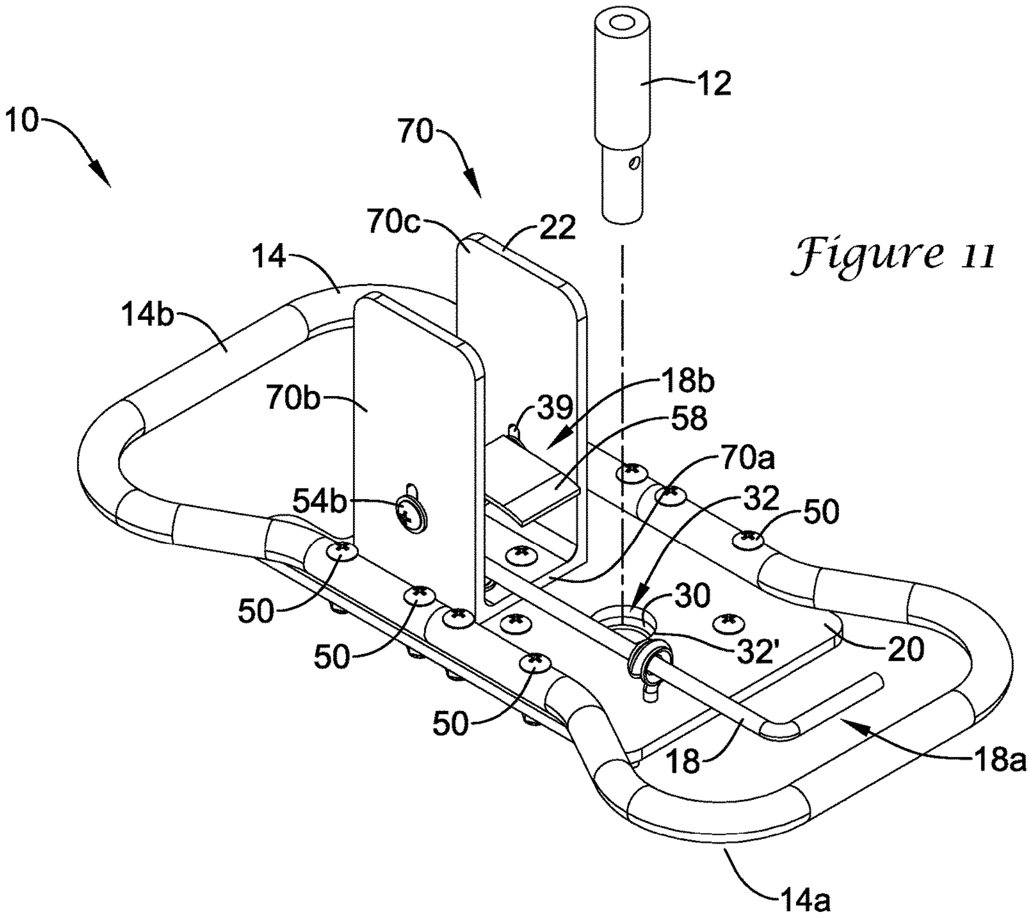
FIG. 11 is a schematic perspective view from above of a second example illustrative power drill assembly attachment, which is similar to that of FIG. 1 but having an alternative side plate configuration.

The side plate 22 may take on any other shape (e.g., any shape in addition to or other than an L-shape) configured to engage and/or abut the handle 44 of the drill assembly 40 when the drill assembly 40 is received in the drill assembly attachment 10. In some instances, the side plate 22 may take on a cradle 70 configuration, as depicted in a second example, in FIG. 11. The cradle 70 may have a first part 70*a*, a second part 70*b*, and a third part 70*c*, where the second part 70*b* and the third part 70*c* extend from the first part 70*a* and are separated such that the handle 44 of the drill assembly 40 may be received between the second part 70*b* and the third part 70*c* of the cradle 70. Illustratively, the second part 70*b* and the third part 70*c* may be arranged such that they receive the handle 44 of the drill assembly 40 therebetween and prevent or at least substantially prevent rotational movement of the handle 44 of the drill assembly 40 in both rotational directions (e.g., clockwise and counter-clockwise) when the drill assembly 40 is positioned within the drill assembly attachment 10. Alternatively, or in addition, the cradle 70 may be formed from two side plates 22 facing each other or other members, such that the handle 44 of a received drill assembly 40 may be prevented or at least substantially prevented from moving in rotational directions relative to the drill assembly attachment 10.

Figure 6:
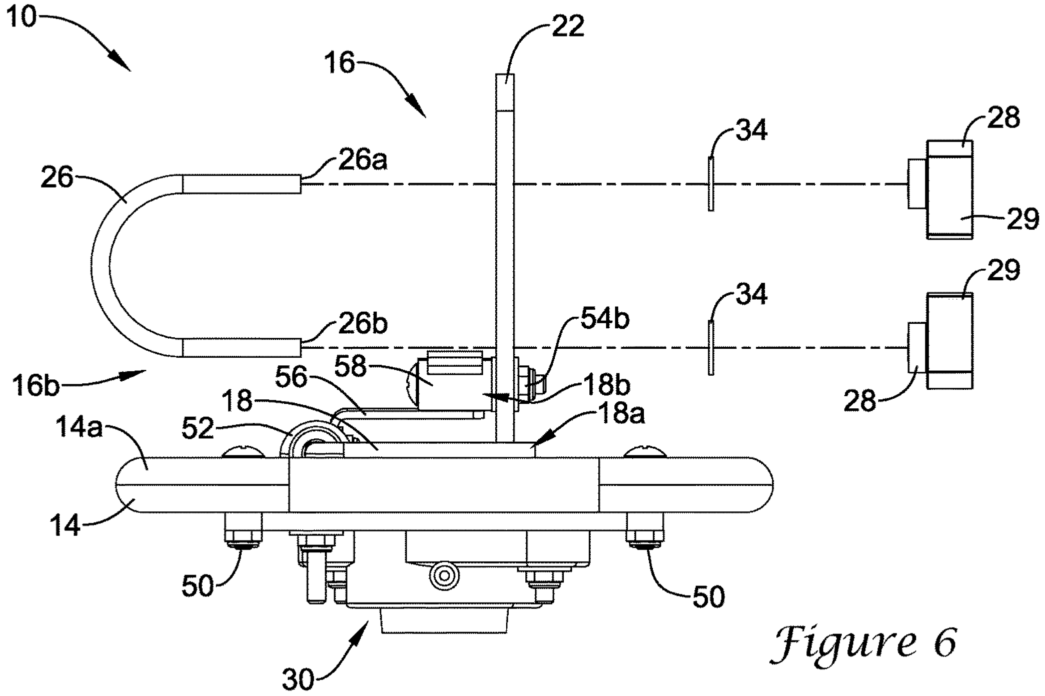
FIG. 6 is a schematic partially exploded end view of the illustrative power drill assembly attachment of FIG. 1.

In some instances, the mounting member or drill mount 16 may include a handle receiving assembly or handle connector 24 that may engage a handle 44 of the drill assembly 40 when the drill assembly 40 is received in the drill assembly attachment 10. For example, as shown in FIGS. 3, 5 and 6, the handle connector 24 may include the side plate 22, one or more connectors or brackets 26 (e.g., a C-bracket, a U-bracket, or any other type of bracket or other feature capable of receiving a handle of a drill assembly), one or more bracket connectors 28, one or more optional washers 34, and/or one or more other features, as desired. The handle receiving assembly or handle connector 24 may be capable of and/or configured to prevent or at least substantially prevent the handle 44 of a received drill assembly 40 from moving in rotational directions relative to the drill mount 16 of the drill assembly attachment 10.

Figure 7:
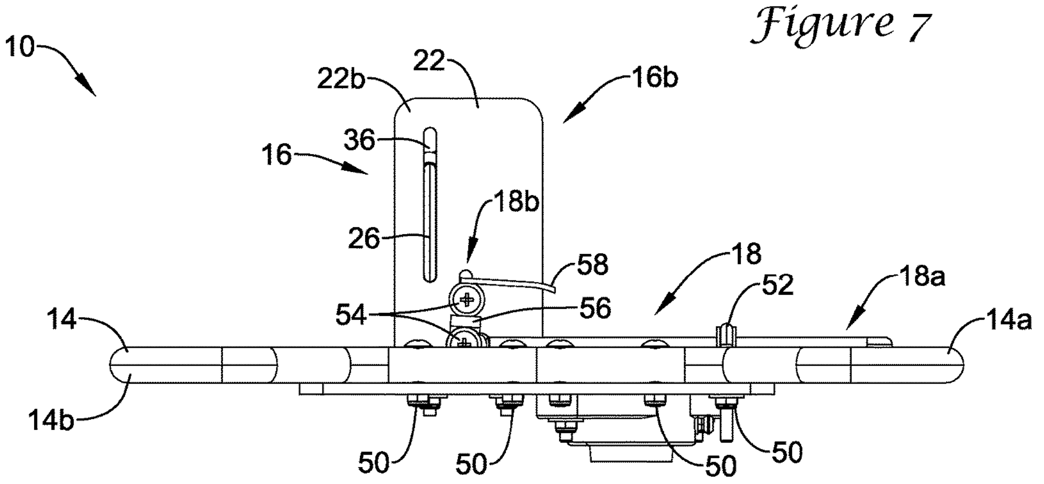
FIG. 7 is a schematic first side view of the illustrative power drill assembly attachment of FIG. 1.
Figure 8:
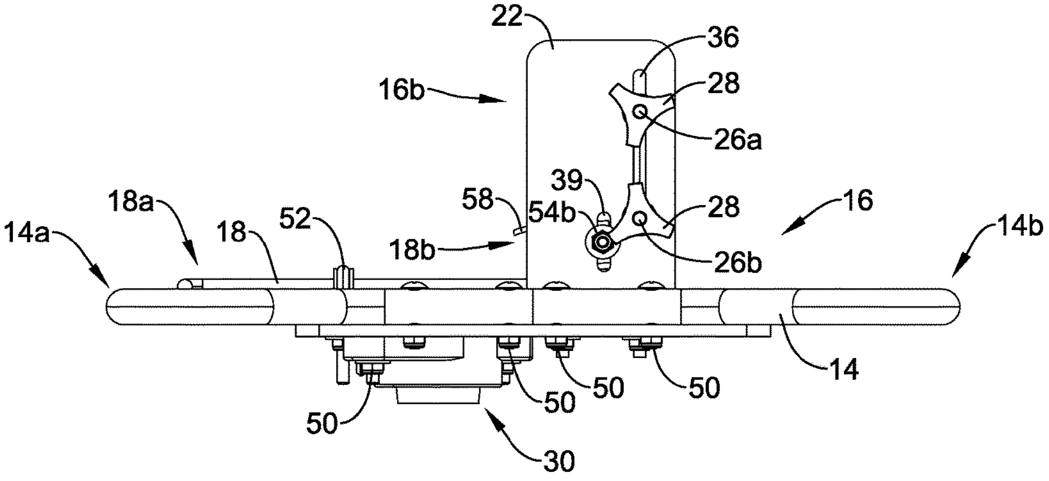
FIG. 8 is a schematic second side view of the illustrative power drill assembly attachment of FIG. 1.

Second portion 16*b* (e.g., the side plate 22) of the mounting member or drill mount 16 may be configured to receive the bracket 26 of the handle connector 24 in one or more openings 36. As shown in FIGS. 3, 7 and 8, an opening 36 in the side plate 22 may be elongated such that it has a length greater than a distance between a first end 26*a* and a second end 26*b* of the bracket 26 to allow a distance from the base plate 20 to the bracket 26 to be adjusted. Additionally, or alternatively, the opening 36 in the side plate 22 may be sized to substantially prevent movement of the bracket 26 in a direction substantially angled from a direction of movement of the bracket 26 in a lengthwise or elongated direction of the elongated opening 36. Although the opening 36 in the side plate 22 is shown in the Figures as a single opening 36, the opening 36 may comprise a plurality of openings having substantially the same shapes and/or sizes, or one or more of the plurality of openings having a shape and/or size different than a shape and/or size of at least one other of the plurality of openings. The multiple openings or various shapes of openings may facilitate adjustment of the bracket 26 within the side plate 22 to fit various drill assembly handles and/or may be provided, if at all, for other purposes.

In some instances, the bracket 26 may be secured to the side plate 22 with one or more bracket connectors 28 (e.g., a nut, a threaded member, or other member configured to connect to one or more of the first end 26*a* and the second end 26*b* of the bracket 26) to at least partially secure a handle 44 of a drill assembly 40 between the bracket 26 and the side plate 22. For example, as shown in FIGS. 5 and 6, a first bracket connector 28*a* may engage the first end 26*a* of the bracket 26 and a second bracket connector 28*b* may engage the second end 26*b* of the bracket 26, where such engagement of the bracket 26 engages the handle 44 of the drill assembly 40 to the side plate 22. Illustratively, the bracket connectors 28 may engage the bracket 26 in any releasable and/or adjustable manner. In one example, the bracket 26 may have threads at or near the bracket ends 26*a*, 26*b* that may engage threads of the bracket connectors 28 (e.g., nuts) in a releasable and/or adjustable manner. Alternatively, the bracket connectors 28 may engage the bracket 26 in a permanent manner.

The bracket connector(s) 28 may take on any shape and/or size. In one example, the bracket connector(s) 28 may have a grip portion 29, as shown in FIG. 6. Illustratively, the grip portion 29 of the bracket connector(s) 28 may be configured to allow a user to adjust and/or remove the bracket connectors 28 with respect to the bracket 26.

When the bracket 26 is connected to the side plate 22 and is engaging, or otherwise held in place with respect to the side plate 22, the handle 44 of the drill assembly 40 may be positioned such that the side plate 22 may prevent or at least substantially prevent movement of the drill assembly 40 in a direction of rotation of a portion of the drill assembly 40 configured to rotate an auger 60 or other feature. In one example, where the side plate 22 is positioned adjacent a left side of the handle 44, the side plate 22 may prevent rotational movement of the handle 44 in a clockwise direction of rotation in which a portion of the drill assembly 40 or feature attached to the drill assembly 40 is rotating. It is contemplated that the drill assembly attachment 10 may prevent and/or facilitate movement of the handle 44 of the drill assembly 40 in other directions and/or in other manners, as desired.

Figure 4:
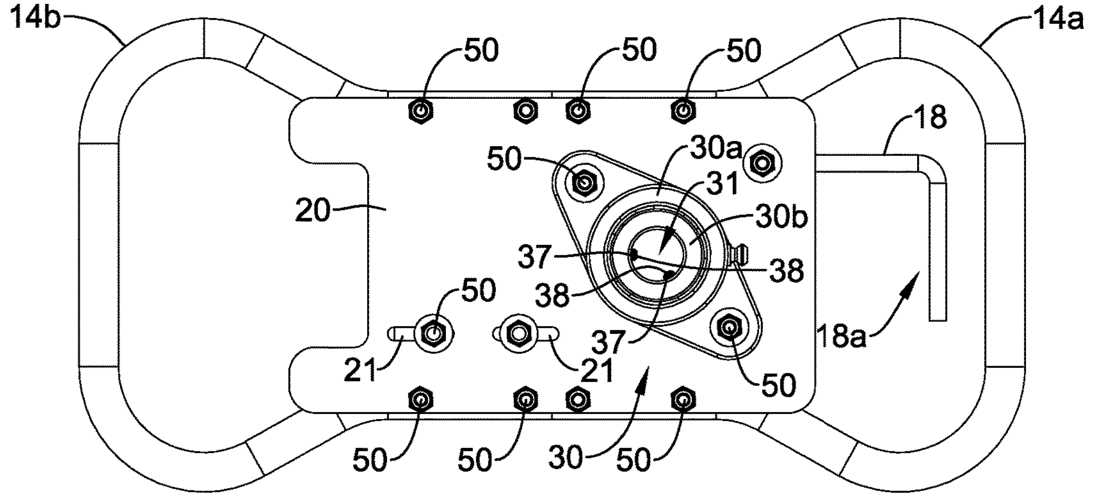
FIG. 4 is a schematic bottom view of the illustrative power drill assembly attachment of FIG. 1.

In some instances, the handle 14 may extend from the mounting member or drill mount 16. The handle 14 may extend substantially around the mounting member or drill mount 16, as shown in FIGS. 3-5. Alternatively, or in addition, as shown in FIGS. 1-11, the handle 14 may have a first handle portion 14*a* extending from a first end of the mounting member or drill mount 16 and a second handle portion 14*b* extending from a second end of the mounting member or drill mount 16 opposite the first end.

The handle 14 may be made from any material in any manner, as desired. For example, the handle 14 may be made from a metal, a polymer, a composite material, or other material capable of structurally withstanding forces from a user and/or drill assembly 40 while the user operates a drill assembly 40 with the drill assembly attachment 10 connected to the drill assembly 40.

The handle 14 may be connected to the mounting member or drill mount 16 in any manner. In one example, as shown in the Figures, the handle 14 may be connected to the mounting member or drill mount 16 (e.g., at the base plate 20) with one or more assembly connectors 50 or other connection mechanism(s). Illustratively, the assembly connectors 50 may include a male threaded member capable of being inserted through the handle 14 and/or the base plate 20 to mate with a female threaded member adjacent or a part of one or more of the base plate 20 and handle 14. Alternatively, or in addition, the handle 14 may be connected to the mounting member or drill mount 16 with any known connection technique. For example, the handle 14 may be connected to the mounting member or drill mount 16 with a weld technique, a bonding technique, an adhesive technique, and/or any other connection technique, as desired.

In some instances, the throttle 18 of the drill assembly attachment 10 may be in adjustable communication with one or more of the mounting member or drill mount 16 and the handle 14 and may have a first portion 18*a* and a second portion 18*b*. Illustratively, a user engaging portion or the first portion 18*a* of the throttle 18 may be positioned or extend proximate the handle 14 and may be engaged by a user (e.g., by a user's hand) and a trigger engaging portion or the second portion 18*b* may be positioned or extend adjacent the second portion 16*b* of the mounting member or drill mount 16 and may selectively engage the trigger 42 of the drill assembly 40 when the drill assembly is received in the drill assembly attachment 10. In one example, a user may grasp the handle 14 of the drill assembly attachment 10 with both hands and, with a hand adjacent the throttle 18, may engage the first portion 18*a* of the throttle 18 to selectively move the second portion 18*b* and engage the trigger 42 of the drill assembly 40. Illustratively, the user may be able to grasp the handle(s) 14 of the drill assembly attachment 10, engage the first portion 18*a* of the throttle 18 to engage the trigger 42 of the drill assembly 40 and apply a force to the drill assembly attachment 10 (e.g., in a downward direction toward a material, in an upward direction away from a material, and/or in a sideways direction) to facilitate an attachment or auxiliary rotatable device (e.g., auger 60, or other attachment) penetrating or otherwise interacting with the material or substance (e.g., ice, dirt, or other material).

The user engaging portion or first portion 18*a* of the throttle 18 may be in rotational communication with the trigger engaging portion or second portion 18*b*. In some instances, the user engaging portion or first portion 18*a* of the throttle 18 may be linearly or substantially linearly actuated or adjusted and in response to the linear or substantially linear actuation or adjustment of the user engaging portion or the first portion 18*a*, the trigger engaging portion or second portion 18*b* of the throttle 18 may be rotationally actuated or adjusted to engage the trigger 42 of the drill assembly 40. Substantially linearly actuating or adjusting the user engaging portion or the first portion 18*a* of the throttle 18 may be defined as adjusting the user engaging portion or the first portion 18*a* less than forty-five (45) degrees, less than thirty (30) degrees, less than fifteen (15) degrees, or less than five (5) degrees from an axis A (as shown in FIG. 3) of the throttle 18. Alternatively, or in addition, substantially linearly actuating or adjusting the user engaging portion or the first portion 18*a* of the throttle 18 may be defined as moving the first portion 18*a* in either direction that axis A extends more than in any other direction deviating from axis A. Other arrangements of the throttle 18 may be utilized, as desired, to engage the trigger 42 of the drill assembly 40. For example, in some embodiments the second portion 18*b* may move linearly or engage the trigger 42 upon rotation of the first portion 18*a* relative to the handle 14.

The first portion 18*a* of the throttle 18 may take on any shape or size, as desired. For example, the first portion 18*a* of the throttle 18 may have an L-shape, as shown in FIGS. 3, 5, 9, and 10, or other shape that may allow a user to grasp an end or portion thereof and actuate or adjust the first portion 18*a* linearly or in another direction.

As discussed, the throttle 18 may be in adjustable communication with one or more of the mounting member or drill mount 16 and the handle 14 of the drill assembly attachment 10. In some instances, a first portion 18*a* of the throttle 18 may be supported by one or more supports 52. Illustratively, the support 52 may extend from the mounting member or drill mount 16 and may be configured to support the throttle 18 a distance from the base plate 20 of the mounting member or drill mount 16. In one example, the support 52 may surround (e.g., entirely surround, substantially entirely surround or partially surround) a portion of the throttle 18 such that radial movement of the throttle 18 is limited. The support 52 may allow the throttle 18 to be actuated or adjusted axially (e.g., linearly), such that the throttle 18 may engage the trigger 42 of a received drill assembly 40. Although particular configurations of the throttle 18 with respect to the handle 14 and/or mounting member or drill mount 16 are discussed herein, other arrangements and/or configurations performing a similar function are contemplated.

The first portion 18*a* of the throttle 18 may communicate with the second portion 18*b* of the throttle 18 in any manner. For example, the first portion 18*a* and the second portion 18*b* of the throttle 18 may be unitarily formed or may connect with a first connector 54*a*, as shown in FIG. 3, (e.g., a screw and nut, any other male threaded member and female threaded member configured to receive the male threaded member, a bearing system, a rivet, or other connector feature) such that the first portion 18*a* and the second portion 18*b* may rotate with respect to one another about the first connector 54*a* or any other pivot point or axis. In some instances, the first portion 18*a* of the throttle 18 may connect with an extender 56 of the second portion 18*b* of the throttle 18 via the first connector 54*a*, where the first connector 54*a* facilitates rotation between the first portion 18*a* and the second portion 18*b* of the throttle 18.

An actuation member 58 of the second portion 18*b* of the throttle 18 may be positioned with respect to the mounting member or drill mount 16 to engage the trigger 42 of a drill assembly 40 received in the mounting member or drill mount 16. The actuation member 58 may be a unitarily formed feature or comprise one or more permanently (as shown in FIG. 3, for example) or adjustably connected features. In instances where the actuation member 58 of the second portion 18*b* of the throttle 18 is distanced from the first portion 18*a* of the throttle 18, the actuation member 58 may be connected to the first portion 18*a* of the throttle 18 through the extender 56, the first connector 54*a*, and/or any other feature connecting or providing communication between the first portion 18*a* and the second portion 18*b* of the throttle 18. In some examples, the actuation member 58 may be permanently or adjustably connected to the extender 56 with a welding technique, a soldering technique, a fusion bonding technique, one or more connection members and/or one or more other connection techniques or connectors known in the art.

A second connector 54*b* (e.g., a screw and nut, any other male threaded member and female threaded member configured to receive the male threaded member, a bearing system, a rivet, or other connector feature) may connect the extender 56 and/or the actuation member 58 to the side plate 22 of the mounting member or drill mount 16 in any manner. For example, the second connector 54*b* may be inserted through the extender 56 and/or the actuator member 58 and into an opening 39 in the side plate 22. In some instances, the opening in the side plate 22 may be elongated and allow for the position of the actuation member 58 to be adjusted with respect to a distance between the actuation member 58 and the base plate 20.

In some instances, the drill assembly attachment 10 may include a bearing assembly 30, as shown in FIG. 4. The bearing assembly 30 may be positioned with respect to the base plate 20 such that it is capable of engaging the chuck 12 and may be connected to a drill assembly 40 when the chuck 12 is inserted into the drill assembly attachment 10. The bearing assembly, in some cases, may engage the chuck 12 with a bearing connector 37 that may be configured to allow a portion of the bearing assembly 30 to rotate with the chuck 12 when the chuck 12 is rotated by the drill assembly 40. In one example, the bearing connector 37 may include one or more set screws 38, as shown in FIG. 4. In other examples, the bearing connector 37 may be any other type of connector capable of creating an adjustable connection between the bearing assembly 30 and the chuck 12 and/or the drill assembly 40.

The bearing assembly 30 may have a first portion 30*a* and a second portion 30*b*. The first portion 30*a* of the bearing assembly 30 may be affixed or otherwise connected to the base plate 20 of the drill mount 16. The first portion 30*a* may be connected to the base plate 20 via assembly connectors 50, other connectors, and/or through any other connection technique. The assembly connectors 50 may include a threaded male member (e.g., a screw, a bolt, etc.) and a threaded female member (e.g., a nut) configured to receive the threaded male member. Alternatively, or in addition, the first portion 30*a* of the bearing assembly 30 may be unitarily formed with the base plate 20 or connected to the base plate 20 with a connection technique, such as a weld technique, a bonding technique, an adhesive technique, and/or other any other connection technique, as desired. The second portion 30*b* of the bearing assembly 30 may be connected to the first portion 30*a* through a bearing connection (not shown) and may be configured to rotate with respect to the first portion 30*a*.

The bearing assembly 30 may define an opening 31 that may be sized to receive the chuck 12 or other rotating feature (e.g., an auger 60) connected to or of the drill assembly 40. In one example, the second portion 30*b* of the bearing assembly 30 may be connected to the base plate 20 and may define or at least partially define the opening 31, wherein the opening 31 may be positioned coaxial or substantially coaxial with the opening 32 in the base plate 20.

Figure 12:
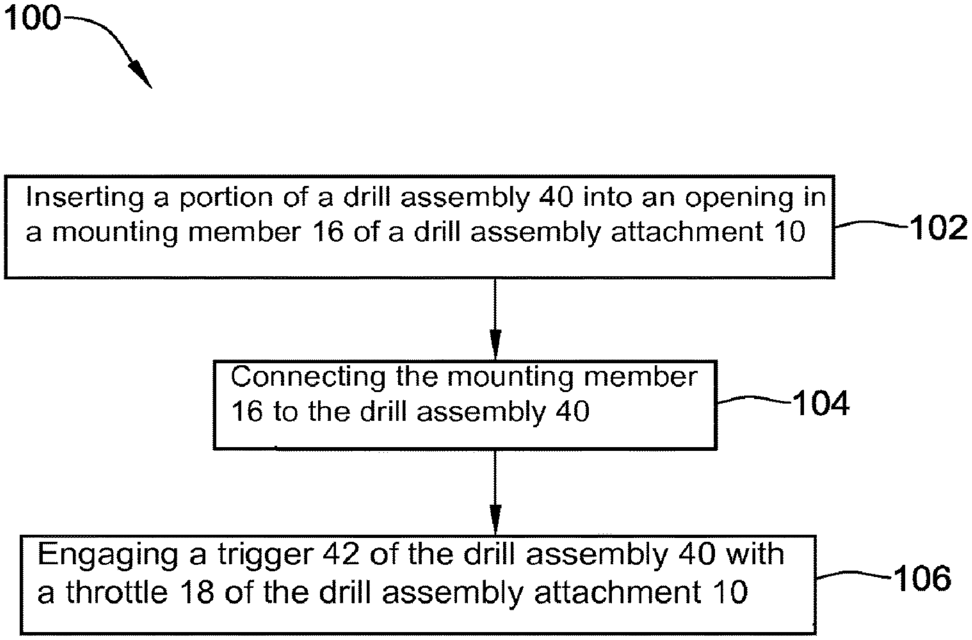
FIG. 12 is a schematic flow chart of an illustrative method of using a power drill assembly attachment.
Figure 13:
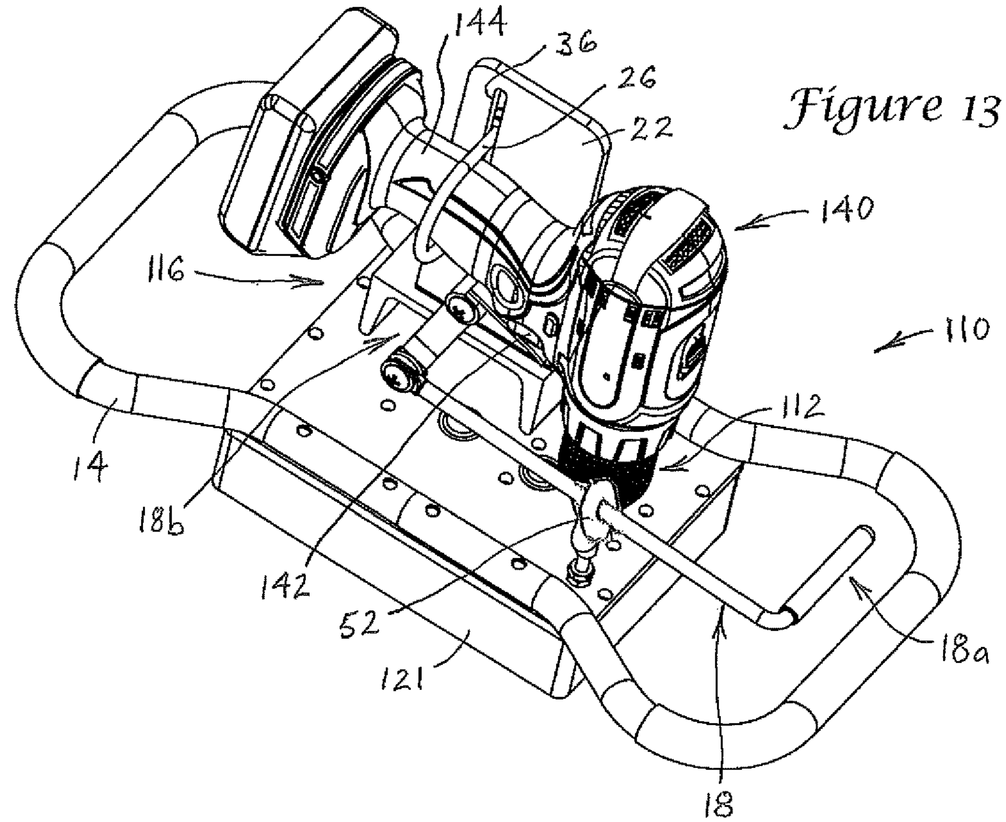
FIG. 13 is a schematic perspective view from above of a third example illustrative power drill assembly attachment and an illustrative power drill assembly.
Figure 14:
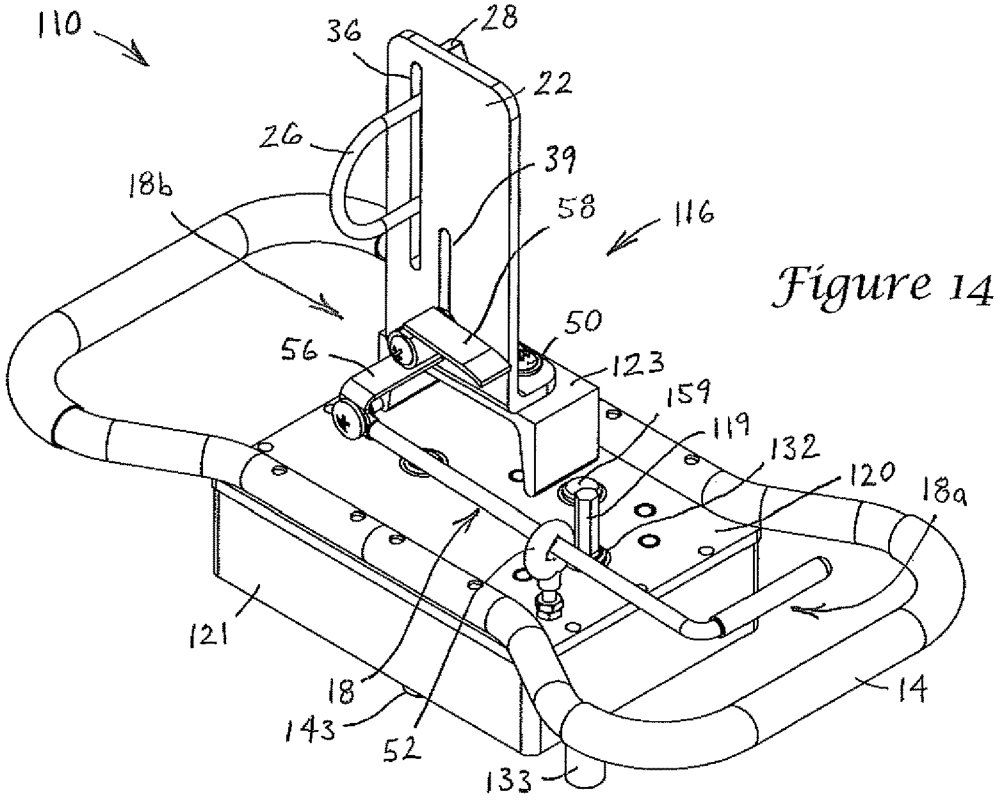
FIG. 14 is a schematic perspective view from above of the illustrative power drill assembly attachment of FIG. 13.
Figure 15:
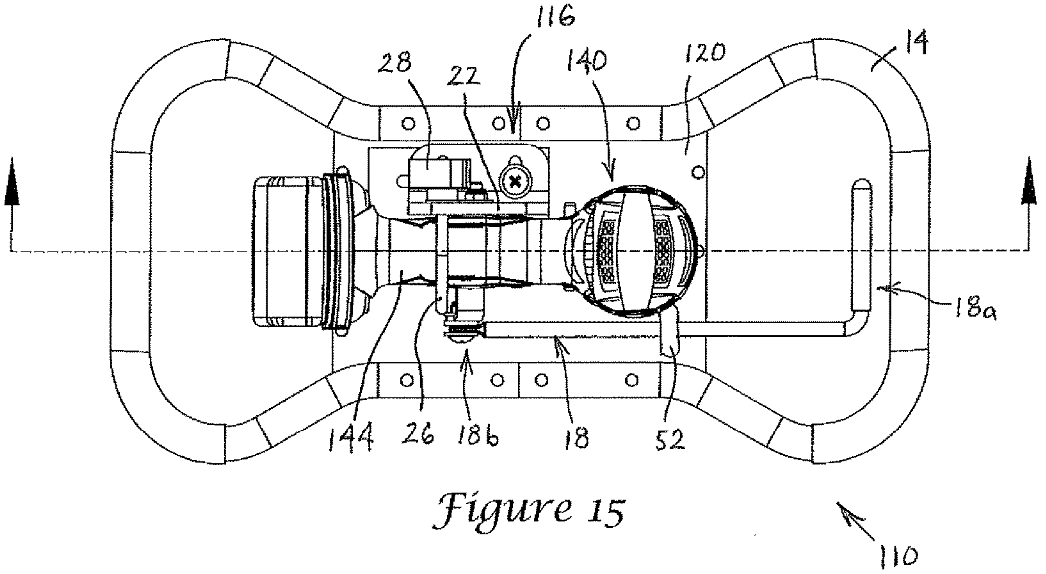
FIG. 15 is a schematic top view of the illustrative power drill assembly attachment and power drill assembly of FIG. 13.
Figure 16:
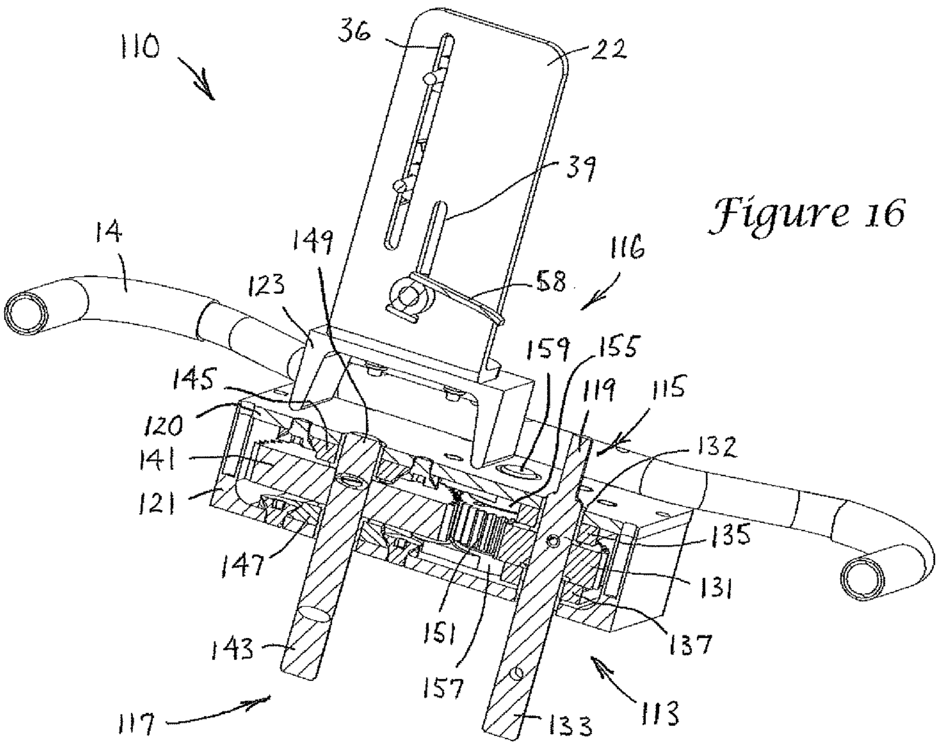
FIG. 16 is a schematic cross-sectional perspective view from above of the illustrative power drill assembly attachment as indicated at the section line in FIG. 15.
Figure 17:
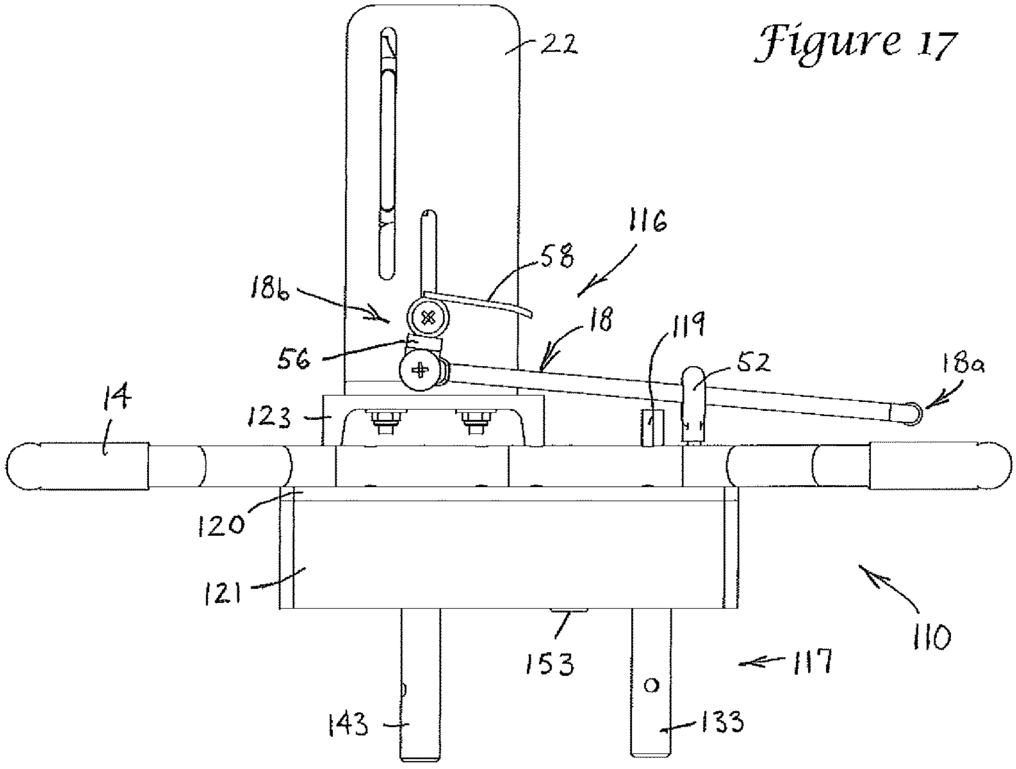
FIG. 17 is a schematic side view of the illustrative power drill assembly attachment of FIG. 13.
Figure 18:
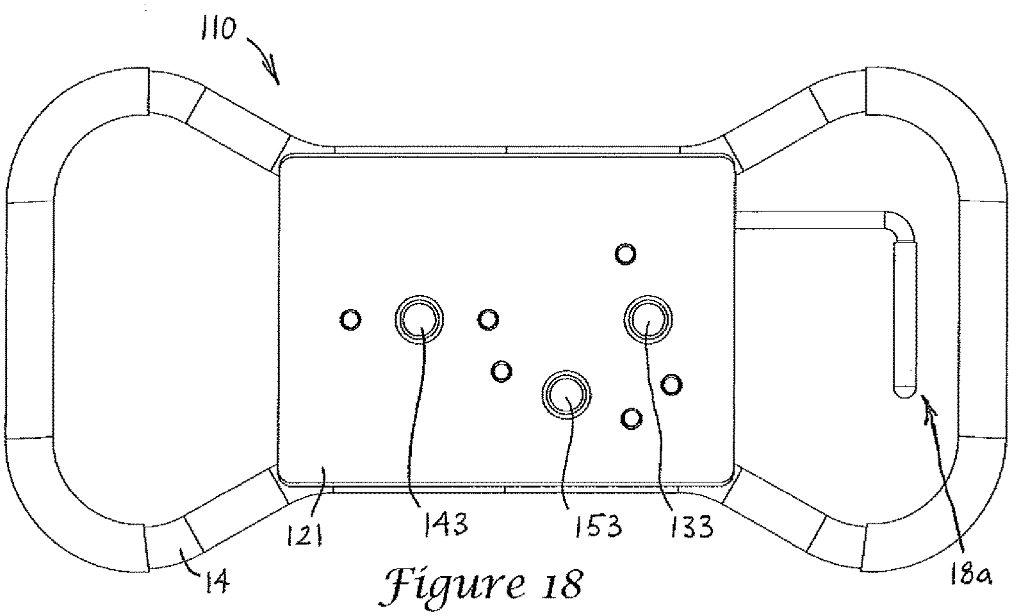
FIG. 18 is a schematic bottom view of the illustrative power drill assembly attachment of FIG. 13.
Figure 19:
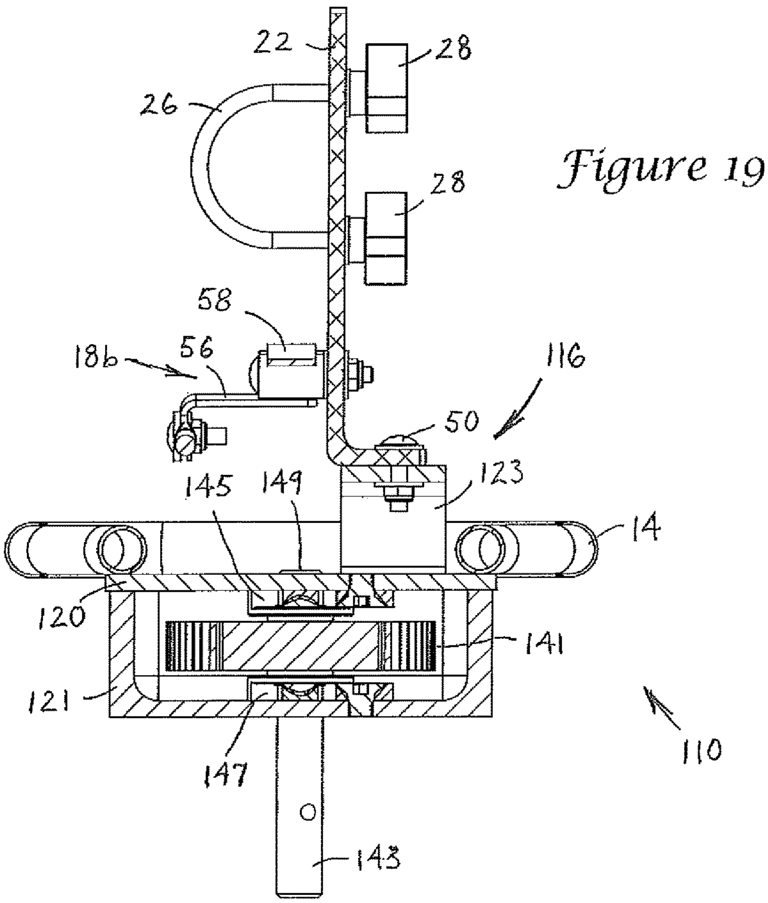
FIG. 19 is a schematic cross-sectional end view of the illustrative power drill assembly attachment of FIG. 13.
Figure 20:
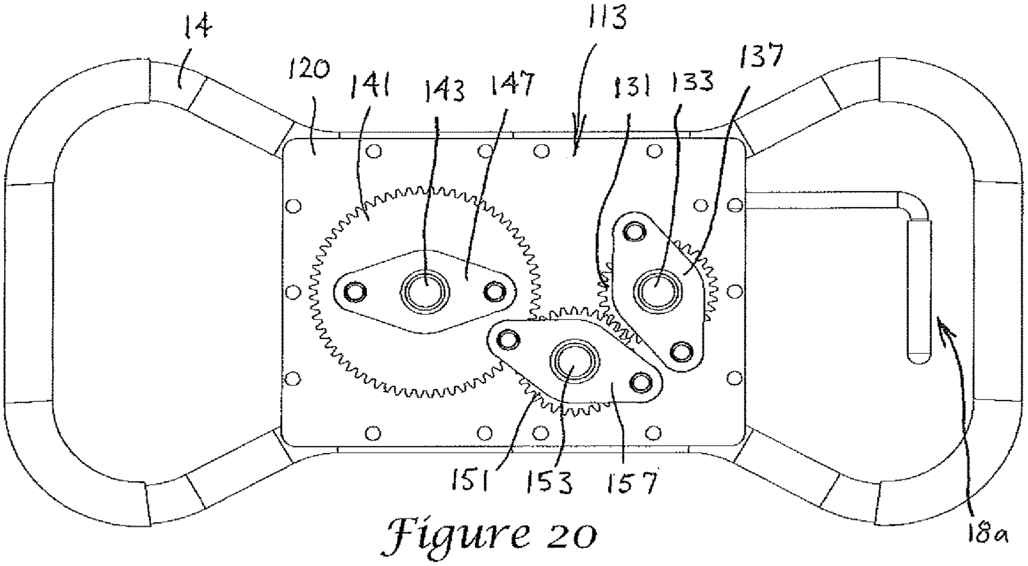
FIG. 20 is a schematic bottom view of the illustrative power drill assembly attachment of FIG. 13, with the drive box removed.
Figure 21:
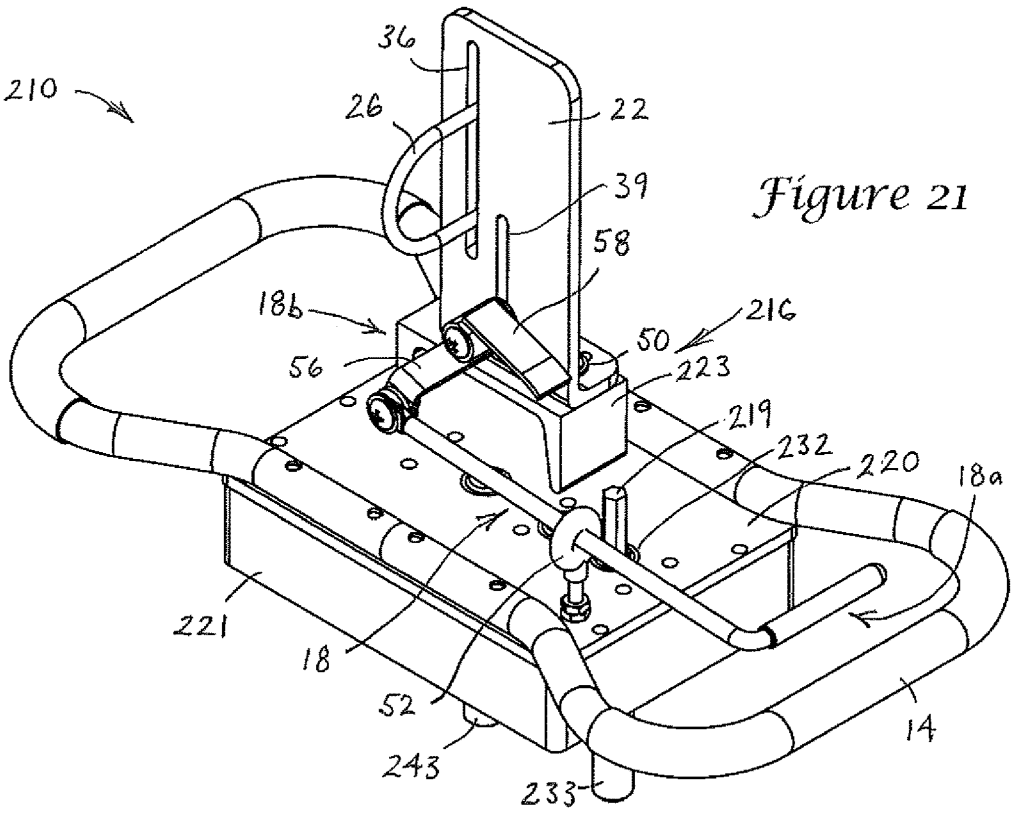
FIG. 21 is a schematic perspective view from above of a fourth example illustrative power drill assembly attachment.
Figure 22:
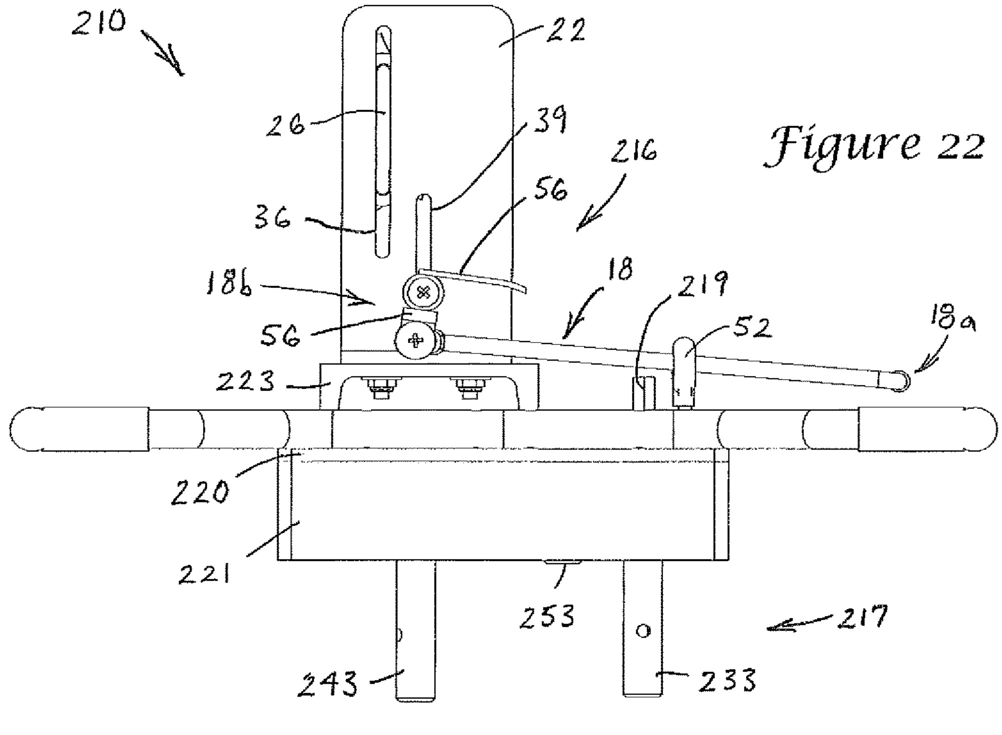
FIG. 22 is a schematic side view of the illustrative power drill assembly attachment of FIG. 21.
Figure 23:
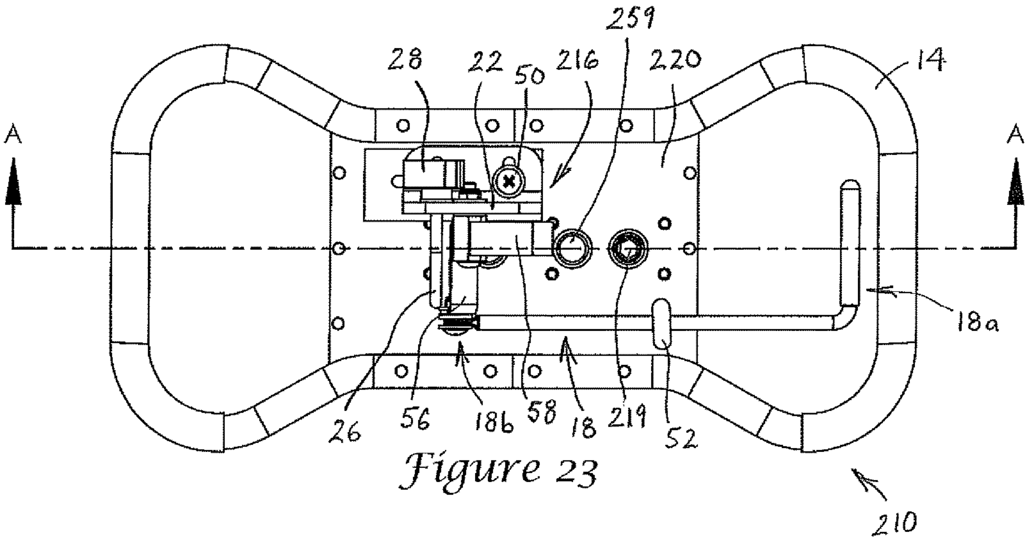
FIG. 23 is a schematic top view of the illustrative power drill assembly attachment of FIG. 21.
Figure 24:
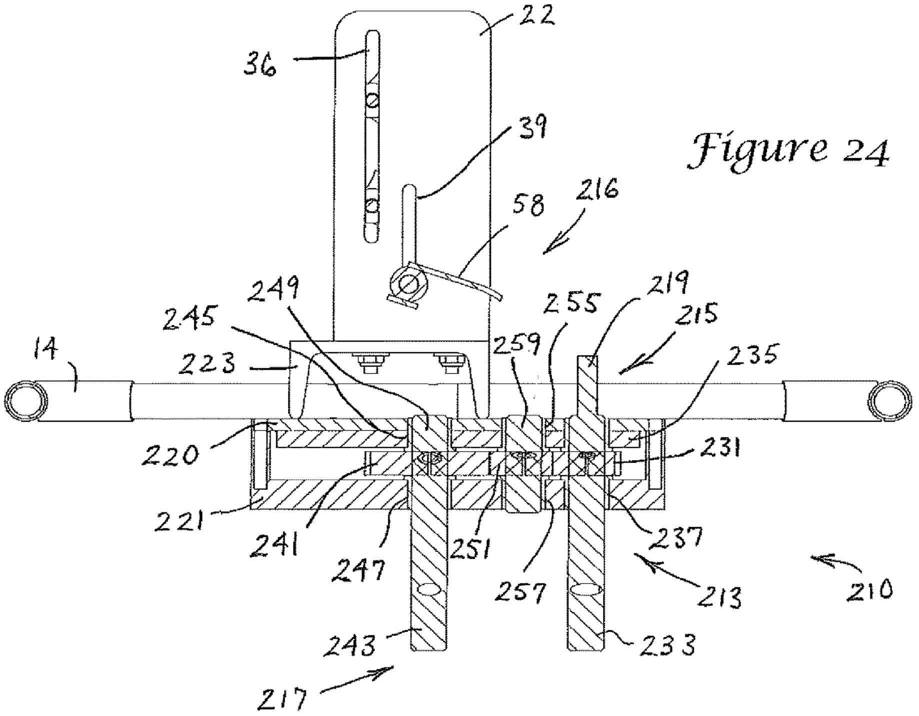
FIG. 24 is a schematic cross-sectional side view of the illustrative power drill assembly attachment as indicated at the section line in FIG. 23.
Figure 27:
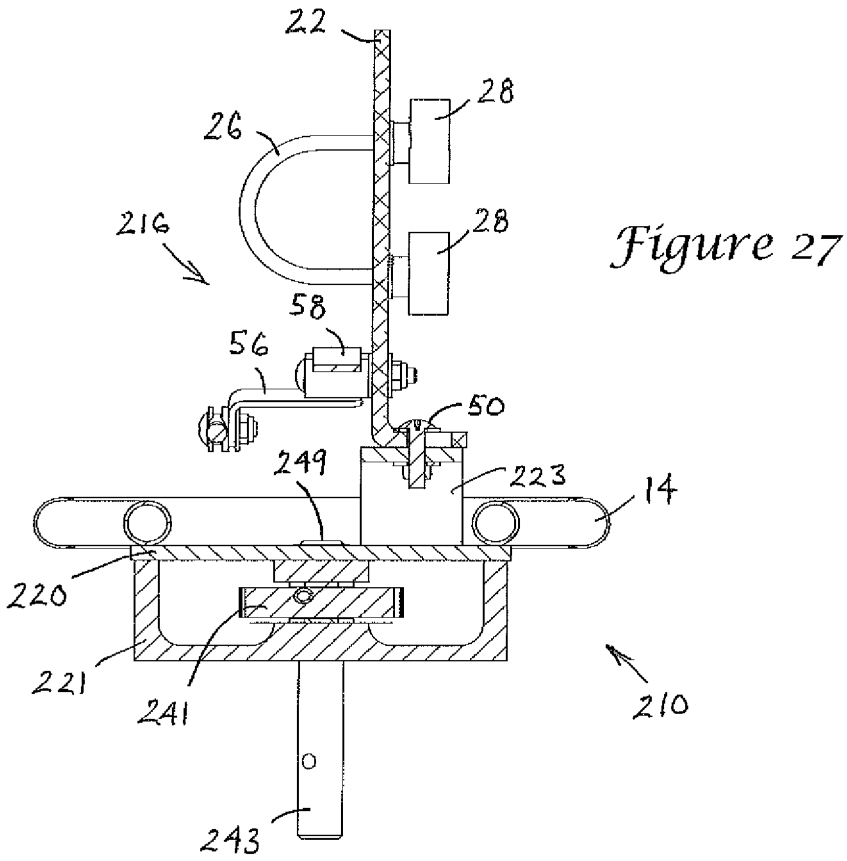
FIG. 27 is a schematic cross-sectional end view of the illustrative power drill assembly attachment of FIG. 21.
Figure 28:
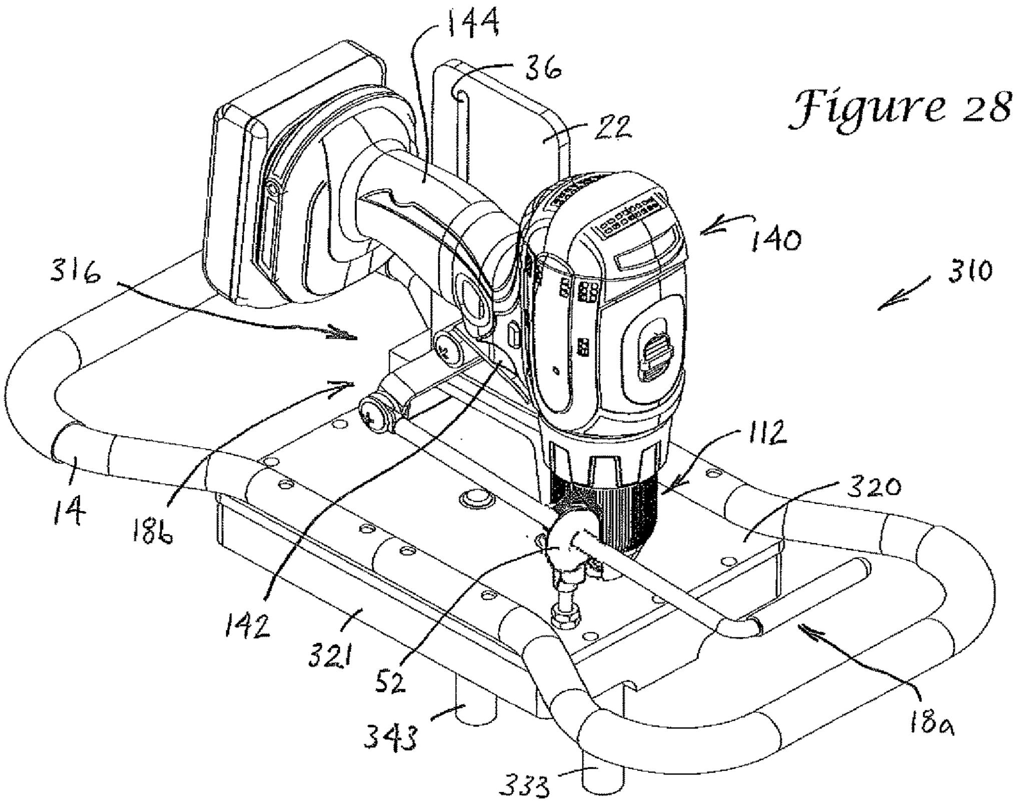
FIG. 28 is a schematic perspective view from above of a fifth example illustrative power drill assembly attachment and an illustrative power drill assembly.
Figure 29:
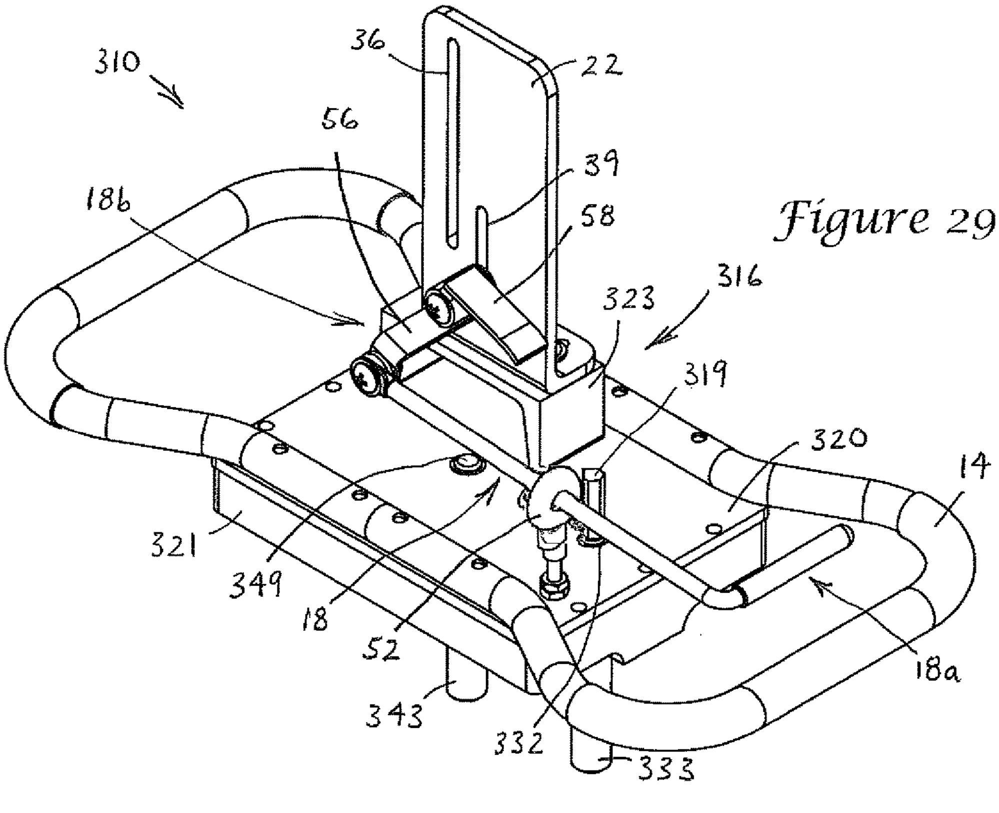
FIG. 29 is a schematic perspective view from above of the illustrative power drill assembly attachment of FIG. 28.
Figure 30:
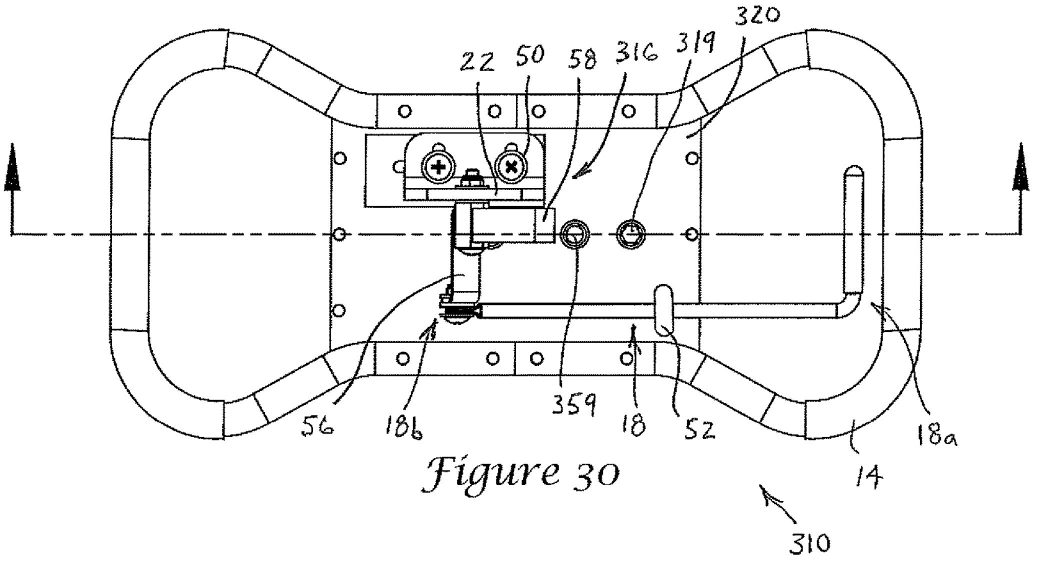
FIG. 30 is a schematic top view of the illustrative power drill assembly attachment of FIG. 28.
Figure 31:
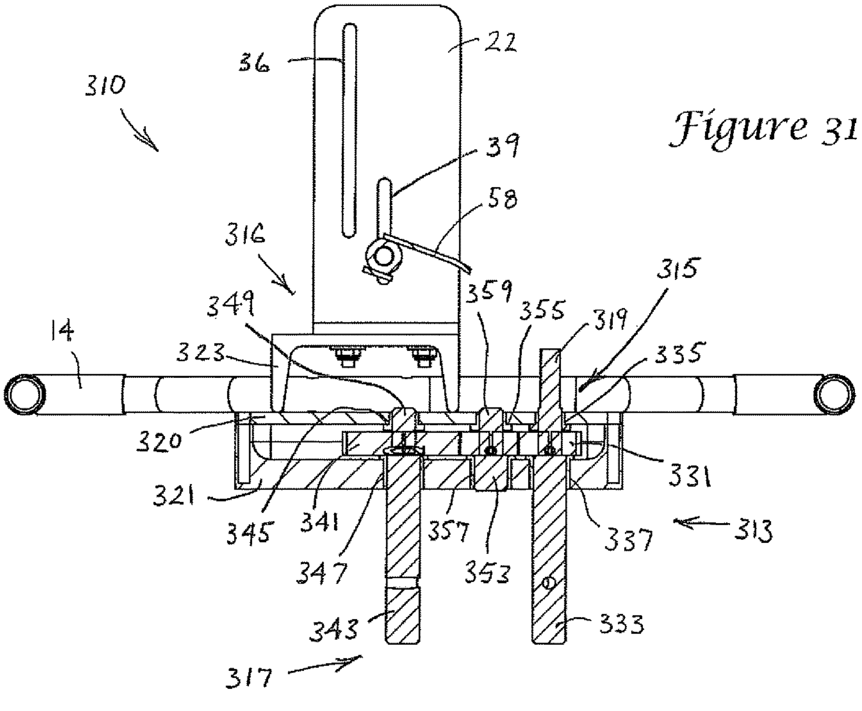
FIG. 31 is a schematic cross-sectional side view of the illustrative power drill assembly attachment as indicated at the section line in FIG. 30.
Figure 32:
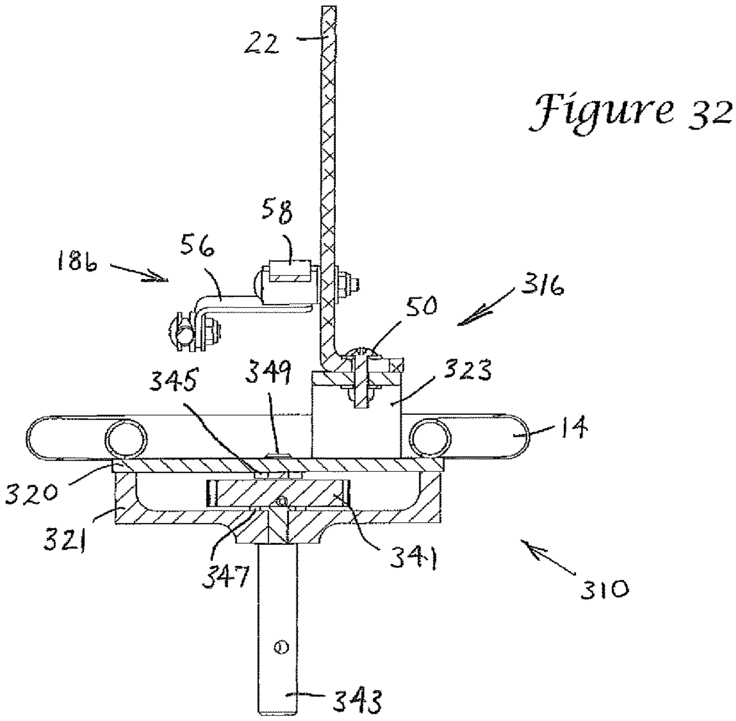
FIG. 32 is a schematic cross-sectional end view of the illustrative power drill assembly attachment of FIG. 28.
Figure 33:
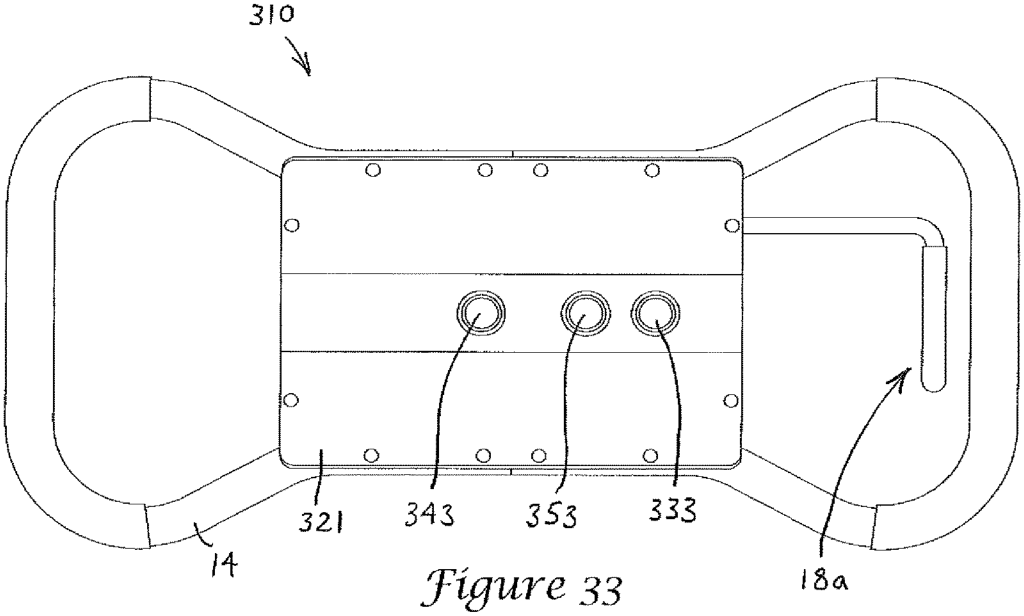
FIG. 33 is a schematic bottom view of the illustrative power drill assembly attachment of FIG. 28.

As shown in FIG. 12, the drill assembly attachment 10 may be used in a method 100 of using a drill assembly 40 (or other drill assembly) and an auger 60. In one example, the method may use a drill assembly attachment 10 having the mounting member or drill mount 16, a handle 14 extending from the mounting member or drill mount 16, and the throttle 18 oriented to be actuatable or adjustable with respect to the mounting member or drill mount 16 and/or the handle 14. The method 100 may be used to drill a hole in ice for ice fishing purposes or other purposes, to drill a hole in dirt for gardening, post digging, or for other purposes, or to drill holes, move materials, stir materials, etc. for a variety of other purposes, as desired.

The method 100 may include a step 102 of inserting a first portion 40*a* of the drill 40 into the opening 32 in the first portion 16*a* (e.g., in the base plate 20) of the mounting member or drill mount 16. In some instances, the step 102 of inserting a first portion 40*a* of the drill assembly 40 may include inserting a portion of the chuck 12 into and/or through the opening 32 in the first portion 16*a* of the mounting member or drill mount 16 such that the first portion 40*a* of the drill assembly 40 may not actually be inserted into the opening 32, or may include inserting any portion (e.g., a small portion, a large portion, or any other portion) of the first portion 40*a* of the drill assembly 40 may be inserted into the opening 32.

In a step 104 of the method 100, a second portion 40*b* (e.g., including the handle 44) of the drill assembly 40 may be connected to a second portion 16*b* (e.g., the side plate 22) of the mounting member or drill mount 16. In one example, the second portion 40*b* of the drill assembly 40 may be connected to the side plate 22 of the mounting member or drill mount 16 with a bracket 26 that may surround a portion of the second portion 40*b* (e.g., a portion of the handle 44) of the drill assembly 40 and engage the second portion 40*b* to the drill assembly 40. In some instances of the connecting step 104, the bracket 26 may be inserted through openings 36 in the side plate 22 and may engage the bracket connectors 28 to engage the second portion 40*b* of the drill assembly 40 between the bracket 26 and the side plate 22.

Figure 9:
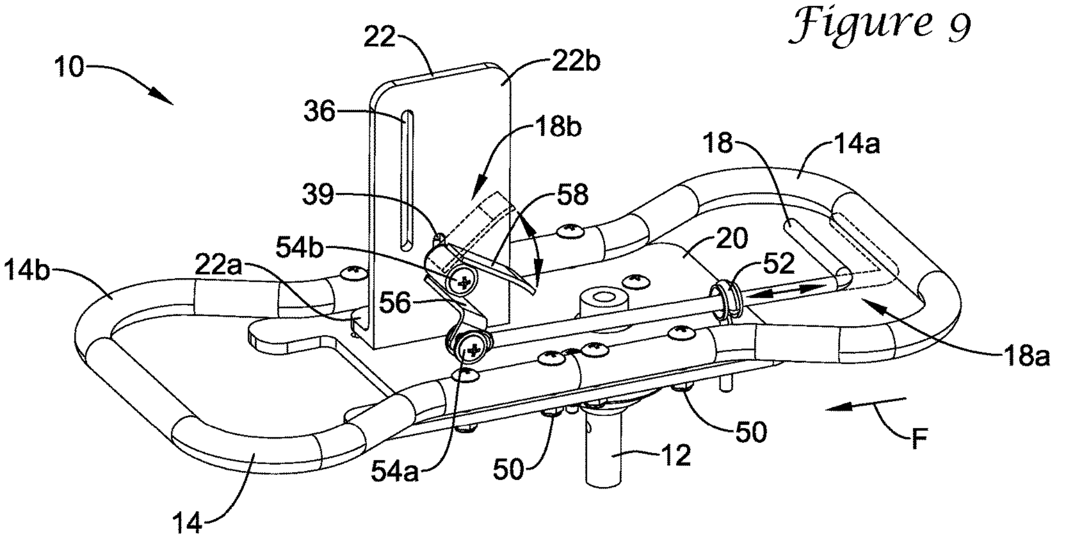
FIG. 9 is a schematic perspective view from above of the illustrative power drill assembly attachment of FIG. 1 showing an illustrative trigger engaging portion in a disengaged position.
Figure 10:
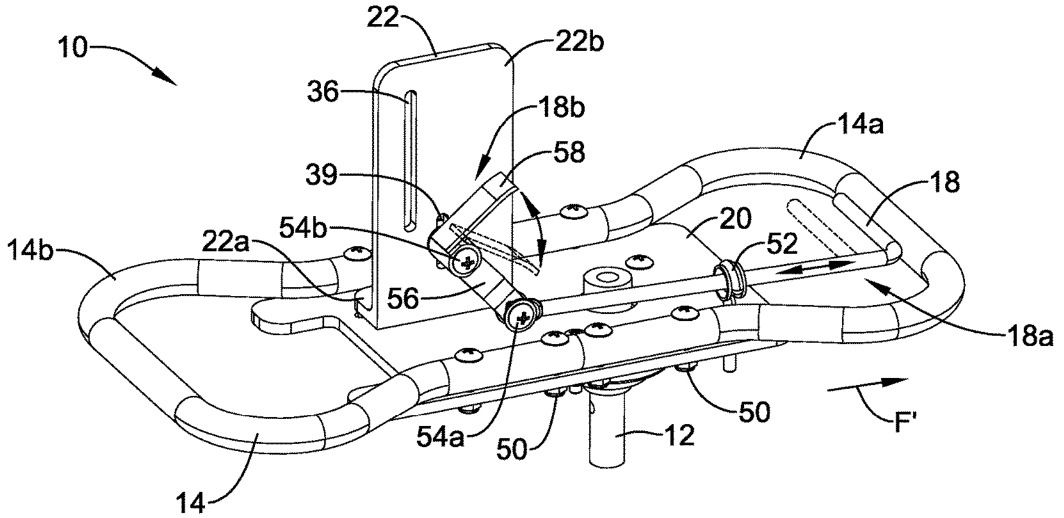
FIG. 10 is a schematic perspective view from above of the illustrative power drill assembly attachment of FIG. 1 showing the illustrative trigger engaging portion in an engaged position.

In some instances, the method 100 may include a step 106 of engaging the trigger 42 of the drill assembly 40 with the actuatable or adjustable throttle 18 of the drill assembly attachment 10. In one example, a user may apply a force to the first portion 18*a* of the throttle 18 to rotationally actuate or adjust the second portion 18*b* of the throttle 18, as shown in FIGS. 9 and 10, and when the drill assembly 40 is received in the drill assembly attachment 10, to selectively engage the trigger 42 of the drill assembly 40. Applying a force to the first portion 18*a* in a first direction (as represented by the arrow F) may position the actuation member 58 in a disengaged position from an engaged position (represented by dotted lines), as shown in FIG. 9, such that the actuation member 58 may be disengaged from the trigger 42 of the drill assembly 40 received in the drill assembly attachment 10. Removing the force in the first direction F and/or applying a force to the first portion 18*a* of the throttle 18 in a second direction (as represented in FIG. 10 by arrow F') opposite or substantially opposite the first direction F may position and/or move the actuation member 58 into an engaged position from a disengaged position (represented by dotted lines), as shown in FIG. 10, where the actuation member 58 may engage the trigger 42 of the drill assembly 40 received in the drill assembly attachment 10. In instances when the throttle 18 is under a bias force (e.g., a force caused by a spring or other force creating mechanism), the actuating member 58 and/or throttle 18 may be biased to the engaged or the disengaged position and the removal of a force in the F or F' direction may allow the actuating member 58 to revert to the position to which it is biased.

In an operative example, a user may grasp the first handle portion 14*a* of the drill assembly attachment 10 with a first hand and grasp the second handle portion 14*b* of the drill assembly attachment 10 with a second hand while continuing to grasp the first handle portion 14*a*. While grasping the handle 14 or other grasping mechanisms with one or more hands, a user may be able to apply a force on the first portion 18*a* of the throttle 18 to engage the trigger 42 with the second portion 18*b* of the throttle 18 and to rotate an auger 60 or other feature attached to the drill assembly 40. In some cases, while rotating the auger 60 or other feature attached to the drill assembly 40, a user may apply a force toward a ground surface or toward any other material to facilitate penetration of the ground surface or movement of the other material with the auger 60 or other feature. Such an arrangement may allow a user to drill a hole in and/or through a surface while securely maintaining the drill assembly 40 in a desired position.

Although method 100 may be depicted and/or described in a particular order, it is contemplated that steps of method 100 may be performed in other orders, as desired. Also, alternative methods of using a drill assembly attachment 10 and an auger 60 with a mounting member or drill mount 16 are contemplated, with such methods including, for example, having a mounting member or drill mount 16, a handle 14 extending from the mounting member or drill mount 16, and an adjustable throttle 18, the method further including connecting a first portion of a drill assembly 40 to the mounting member or drill mount 16, connecting a second portion of the drill assembly 40 to the auger 60, and locating a portion of the throttle 18 of the drill assembly attachment 10 adjacent a trigger 42 of the drill assembly 40.

Such alternative methods may further include steps such as grasping first and second portions of the handle 14 of the drill assembly attachment 10, and moving the adjustable throttle 18 relative to the handle 14 of the drill assembly attachment 10, wherein the throttle 18 engages the trigger 42 of the drill assembly 40.

In further example embodiments within the present disclosure, drill assembly attachments may include a drive assembly that provides for an alternative connection to a drill assembly, for an alternative connection to a rotatable device, such as an auger, and/or for alternative drive mechanisms capable of altering the torque applied by the drill assembly to a rotatable device. Indeed, some example embodiments advantageously include a drive assembly that permits use of a drill assembly with a standard keyless or keyed chuck, as opposed to having to utilize a special chuck that is unique to the drive assembly attachment. Some example embodiments include a drive assembly that is able to increase the torque applied to a rotatable device, such as a may be needed with an auger having a larger diameter blade. In addition, some example embodiments advantageously include a drive assembly having an output mechanism that permits connection of a rotatable device to more than one output shaft, wherein the output shafts provide different respective rotational speeds and torques.

Further example embodiments of drill assembly attachments with drive assemblies having alternative structures and means of connection and/or different drive mechanisms are provided, for instance, in a third example drill assembly attachment 110 shown in FIGS. 13-20, a fourth example drill assembly attachment 210 shown in FIGS. 21-27, a fifth example drill assembly attachment 310 shown in FIGS. 28-34, a sixth example drill assembly attachment 410 shown in FIGS. 36-40, and a seventh example drill assembly attachment 510 shown in FIGS. 41-47.

Although certain features may be shown in one embodiment of a drive assembly attachment, any of the features may be used in other combinations of features and/or other combinations of embodiments, unless explicitly indicated otherwise. Additionally, a feature in one figure that appears to be similar to a feature in another figure may be the same feature, unless expressly indicated otherwise. Also, for brevity and convenience, the further example embodiments will be described with respect to their major components, as opposed to in the same level of detail used to describe the first example embodiment. However, one of skill in the art will recognize the similarity between respective components and that much of the detail of the description of the first example also would apply to the further example drill assembly attachments. Also, it will be understood that the materials and example methods of construction described with respect to the aforementioned first two examples also apply to the additional examples discussed hereafter.

The various drill assembly attachments depicted in FIGS. 1-11, 13-34 and 36-47 may be configured to be used to transmit torque and power in a dependable and safe manner from a cordless drill or other drill assembly to a rotatable device, such as an auger or other previously mentioned device. An auger may have a blade of the type that may otherwise be used with a manual drill, for use in a process of drilling a hole through ice or other materials (e.g., dirt, sand, etc.). In some instances, the drill assembly attachment may be configured to transmit torque and power from a cordless drill assembly to an auger having a blade with a diameter of 2", 4", 6", 8", 10", 12", 14", or any diameter size therebetween, less than 2", or greater than 14". For example, a particular drive assembly may be configured to transmit torque and power from a cordless drill assembly to an auger having a blade diameter of 6", 8", or 10". As will be described further herein, the drill assembly attachment may be configured with a drive assembly such that a rotatable device may be attached to an output mechanism that extends directly from an input shaft, or that is provided by a separate output shaft, or wherein both options are provided.

The drive assembly will include a drive or input mechanism and a driven or output mechanism. The input mechanism may be configured to be rotated by a drill assembly received in the drill assembly attachment. The input mechanism may include, among other features, one or more of a drive or input shaft and a drive or input wheel, which may be connected in one or more manners, or monolithically formed as one continuous piece. The output mechanism may be configured as an opposed end of the input mechanism, such as an output shaft that is provided at an opposite end of the input shaft. Alternatively, the output mechanism may be configured to include a separate output shaft that rotates as a result of rotational movement of the input mechanism. For instance, the output mechanism may include, among other features, a driven or output wheel and a driven or output shaft, which may be connected to one another in one or more manners, or monolithically formed as one continuous piece.

In some cases, the drive assembly may include an intermediate or idler mechanism. The idler mechanism may be configured to facilitate operative communication or coupling between the input mechanism and the output mechanism. The input mechanism, the idler mechanism, and the output mechanism may be arranged in any manner with respect to one another as long as the idler mechanism is configured to transfer rotational movement from the input mechanism to the output mechanism. Illustratively, the idler mechanism may include, among other features, an intermediate or idler wheel and an intermediate or idler shaft, which may be connected in one or more manners or monolithically formed as one continuous piece. In some cases, the idler mechanism may include a plurality of intermediate or idler wheels with a plurality of respective intermediate or idler shafts.

The drive assembly may include one or more drive systems to operatively couple one or more of the input mechanism, the idler mechanism, and the output mechanism with one or more of each other, respectively. The drive assembly, for example, may include one or more of a gear drive system, a belt drive system, and a chain drive system. In a gear drive system, one or more of the input, idler and output wheels may include gear teeth configured to engage respective gear teeth of one of the other wheels. In a belt drive or chain system, a belt or chain may interact with one or more of the wheels or shafts of the input mechanism, the idler mechanism, and the output mechanism. Accordingly, such wheels or shafts of a belt drive or chain drive system may be configured as sprockets to interact with a belt or chain. Other drive systems may be configured to transfer movement from a drive or input mechanism to a driven or output mechanism, as desired.

Figures 34, 35:
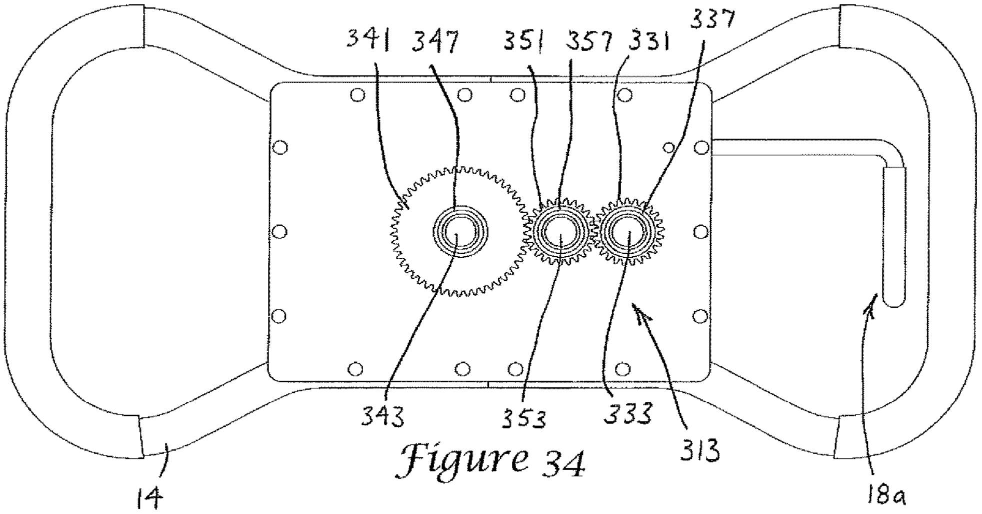
FIG. 34 is a schematic bottom view of the illustrative power drill assembly attachment of FIG. 28, with the drive box removed.
FIG. 35 is a table providing sample test results of torque output of an illustrative power drill assembly attachment with different rotatable devices attached thereto.
Figure 36:
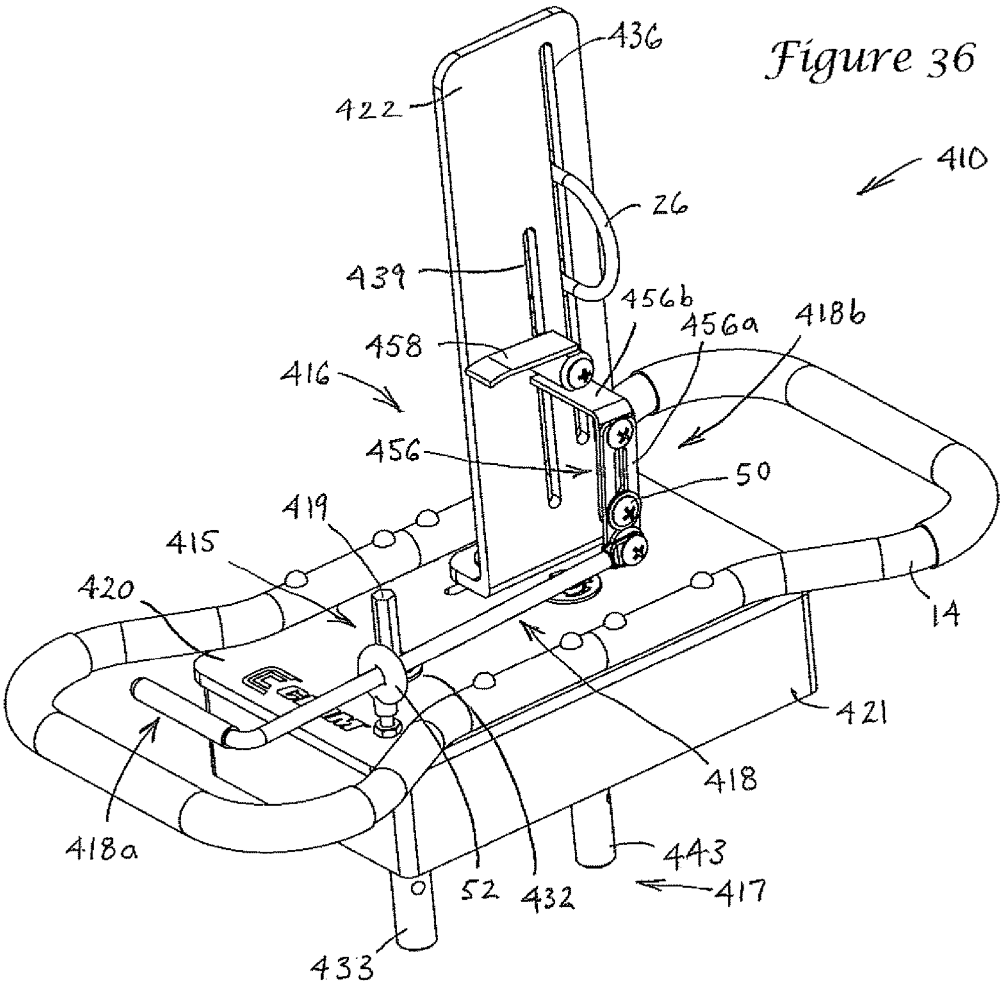
FIG. 36 is a schematic perspective view from above of a sixth example illustrative power drill assembly attachment.
Figure 37:
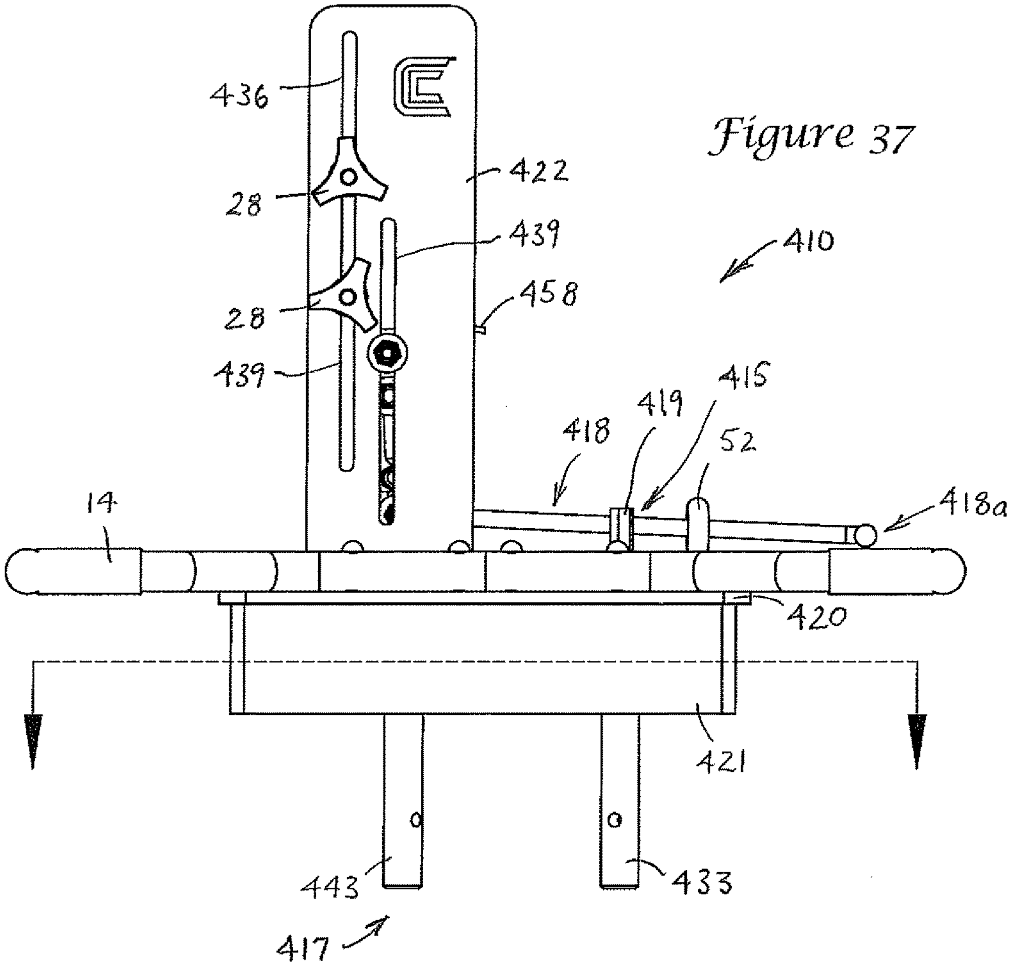
FIG. 37 is a schematic side view of the illustrative power drill assembly attachment of FIG. 36.
Figure 38:
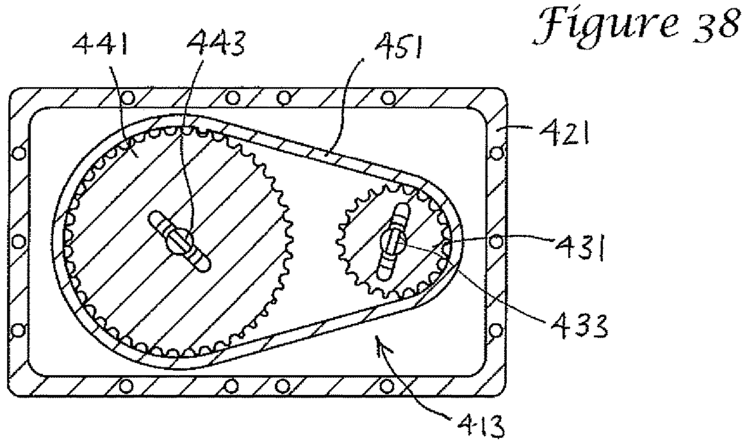
FIG. 38 is a schematic cross-sectional top view of the drive box of the illustrative power drill assembly attachment as indicated at the section line in FIG. 37.
Figure 39:
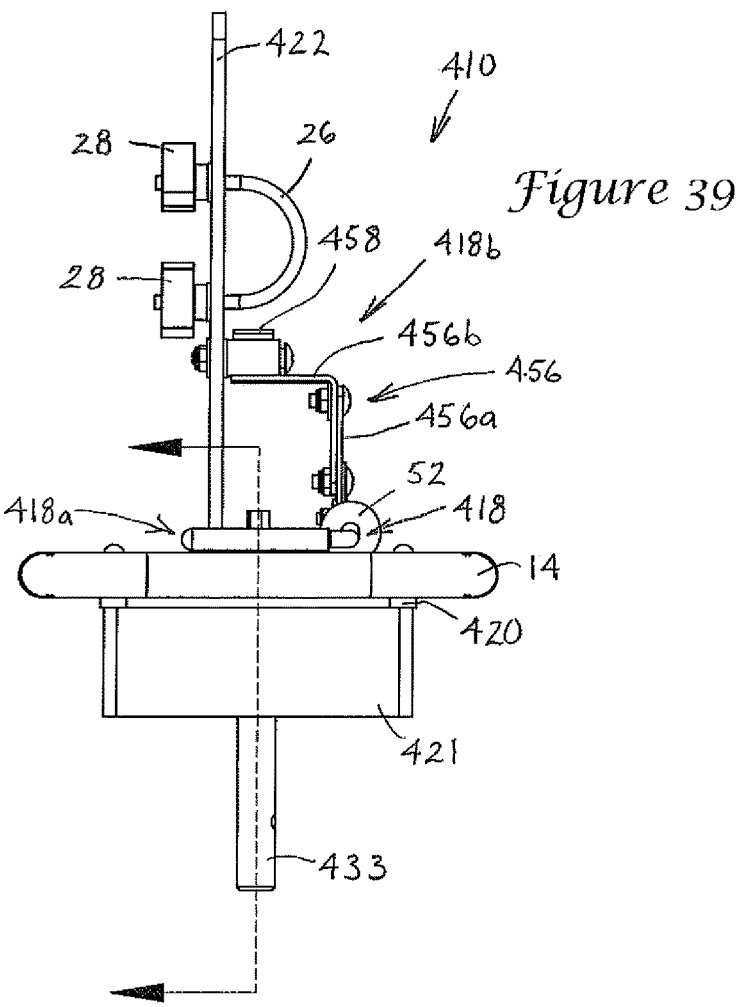
FIG. 39 is a schematic end view of the illustrative power drill assembly attachment of FIG. 36.
Figure 40:
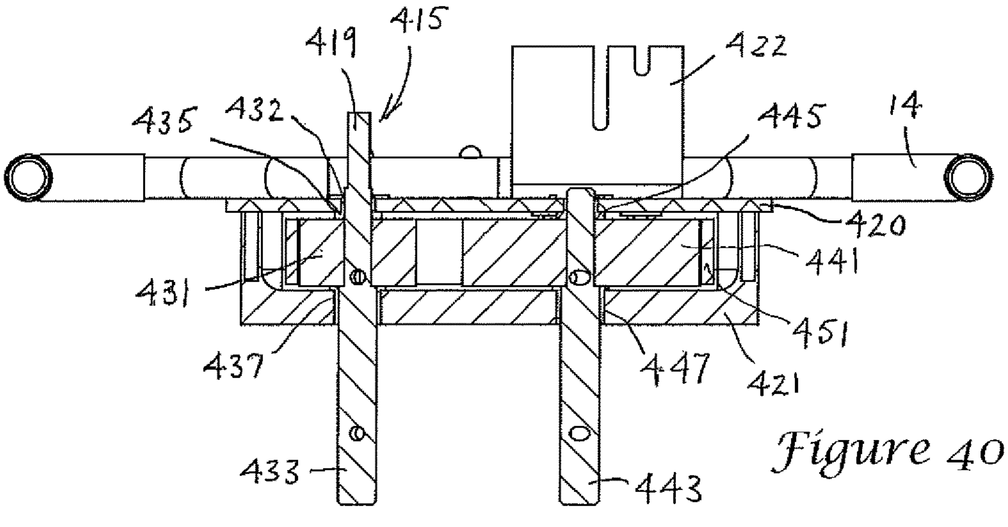
FIG. 40 is a schematic cross-sectional side view of the illustrative power drill assembly attachment as indicated at the section line in FIG. 39, and showing only a portion of the side plate.

In one example gear drive system, the input mechanism may include an input wheel with a diametrical pitch of sixteen (16), thirty-two (32) teeth, a diameter of two (2) inches, a pressure angle of twenty (20) degrees, and a face width of three quarters (¾) of an inch. The output mechanism of the gear drive system may include an output wheel with a diametrical pitch of sixteen (16), sixty-four (64) teeth, a diameter of four (4) inches, a pressure angle of twenty (20) degrees, and a face width of three quarters (¾) of an inch. Such a configuration of the input wheel and the output wheel of a gear drive system may tolerate the stress, torque, and power throughput generated by a 6" diameter hand auger, an 8" diameter hand auger, an 8" power auger, a 10" power auger, and/or an 8" chipper auger with a safety factor of 2. Example test data showing a torque output in foot-pounds (ft-lbs) of such a configuration using the different sizes and types of auger is shown in FIG. 35.

In one illustrative instance, a drive assembly may be configured to reduce the rotational speed (in rotations per minute or RPM) at the input mechanism by one half. This results in the rotational speed at the output mechanism being half of the rotational speed at the input mechanism. Thus, such a drive assembly would have a ratio of RPMs at the input mechanism to the RPMs at the output mechanism of two to one (2:1). Such a ratio may be used to provide approximately twice as much torque to be provided or output by the output mechanism as is provided by the drill assembly at the input mechanism.

Several of these aspects will be evident upon review of the additional example embodiments described further herein. For instance, as shown in FIGS. 13-20, a third example drill assembly attachment 110 is configured for use with a power drill assembly 140 having a standard keyless chuck 112, a handle 144 and a trigger 142. The example drill assembly attachment 110 includes a drill mount 116 and a drive assembly 113 connected to a handle 14. As with the first example, the drill mount 116 may include a base plate 120 and a side plate 22 configured to receive the drill assembly 140, such as by using a bracket 26 extending through one or more openings 36, and bracket connectors 28, to removably secure the handle 144 of the drill assembly 140 adjacent the side plate 22.

In this example, the side plate 22 is connected to an optional elevated mount 123 that is connected to the base plate 120, such as by welding. It will be appreciated that the elevated mount 123 may be connected to the base plate in a permanent or removable manner, and other suitable means of connection, such as the use of fasteners, may be employed. In this example, assembly connectors 50 may connect the side plate 22 to the elevated mount 123, by utilizing similar shaped openings as were used for connection of components in the first example. The optional elevated mount 123 may provide for use of power drill assemblies having a larger configuration.

The third example drill assembly attachment 110 also includes a drive assembly 113, having a drive or input mechanism 115 and a driven or output mechanism 117 in operative communication with the input mechanism 115. In this example, the input mechanism 115 includes a shaft 119 that may be referred to as an input shaft or as an input shaft end that extends through an opening 132 in the base plate 120. This example further includes a housing or drive box 121, which is connected to one or more of the mounting member 116 and the handle 14. In this example, the drive box 121 is disposed below and connected to the base plate 120 portion of the mounting member 116, such as by use of removable fasteners about its perimeter. The base plate 120 also serves as a drive box cover. The drive box 121 houses portions of the input mechanism 115 and output mechanism 117 of the drive assembly 113.

The input mechanism 115 of this example includes an input wheel 131 that is connected to the input shaft 119, such as by use of a set screw or key, although the input wheel 131 and input shaft 119 alternatively may be formed as a monolithic, single continuous piece. As noted, the input shaft 119 includes an upper input shaft end that is configured to be removably connected to the chuck 112 of the drill assembly 140, which may be a keyless or keyed chuck. The input shaft end may have a non-cylindrical shape to prevent rotational slippage of the chuck 112 relative to the input shaft 119. In this example, the opposed end of the input shaft 119 provides a portion of the output mechanism 117, in the form of an output shaft end or first output shaft 133, which extends through the drive box 121, to which a rotatable device may be removably connected, such as an auger like that of the auger 60 from the first example drill assembly attachment 10, or the auger 560 described further herein with respect to a seventh example drill assembly attachment 510.

In this example, the input shaft 119, input wheel 131 and first output shaft 133 are rotatably connected to the base plate or drive box cover 120 by a first bearing assembly 135, which is located above the input wheel 131 and adjacent the opening 132. The first bearing assembly 135 may utilize bearing components in the form of ball bearings or roller bearings, or a bushing sleeve or the like, and may be fixedly or removably connected to the base plate 120, such as by use of fasteners or other suitable means of connection. A second bearing assembly 137 may be located on the opposed side or below the input wheel 131 and fixedly or removably connected to the drive box 121 by any of the aforementioned means of connection, and employing suitable bearing components.

The output mechanism 117 of this example includes an output wheel 141 that is connected to a second output shaft 143, such as by use of a set screw or key, although the output wheel 141 and output shaft 143 alternatively may be formed as a monolithic, single continuous piece. The output shaft 143 is configured for removable connection to a rotatable device, such as an auger or the like. The output shaft 143 includes an upper end 149 that may be configured to be received in an opening of and rotatably connected to the base plate or drive box cover 120, such as by a first bearing assembly 145, or may be entirely concealed by the base plate 120. The first bearing assembly 145 may utilize bearing components and be connected to the base plate 120, as described previously with respect to the first bearing assembly 135 for the input mechanism 115. A second bearing assembly 147 may be located below the output wheel 141 and fixedly or removably connected to the drive box 121 by any of the aforementioned means of connection, and having suitable bearing components.

The third example shown in FIGS. 13-20 also includes an intermediate or idler mechanism 150 having an intermediate or idler wheel 151 that is connected to an intermediate or idler shaft 153, such as by use of a set screw or key, although the idler wheel 151 and idler shaft 153 alternatively may be formed as a monolithic, single continuous piece. The idler shaft 153 includes an upper end 159 that is configured to be received in an opening of and rotatably connected to the base plate or drive box cover 120 by a first bearing assembly 155. The first bearing assembly 155 may utilize a bearing device and be connected to the base plate 120, as described previously with respect to the first bearing assembly 135 for the input mechanism 115. A second bearing assembly 157 may be located below the idler wheel 151 and fixedly or removably connected to the drive box 121 by any of the aforementioned means of connection, and having suitable bearing components. The idler wheel 151 is configured to be operably coupled to the input wheel 131 and the output wheel 141. This arrangement, which uses an idler wheel 151, causes the second output shaft 143 to rotate in the same direction as the first output shaft 133. As such, both output shafts may be configured to rotate in the appropriate direction to utilize a cutting edge of a rotatable device, such as an auger or other implement.

It also will be appreciated that the input mechanism 115 is configured to rotate at a first rotational speed and the output mechanism 117 is configured to rotate at a second rotational speed, with the first rotational speed being greater than the second rotational speed. This is due to the input wheel 131 being of a different size, which is smaller, than the output wheel 141. For instance, in the present example, the ratio of the first rotational speed of the input mechanism 115 at the input shaft 119 to the second rotational speed of the output mechanism 117 at the output shaft 143 is at least 2 to 1. The different sizes of the respective wheels also result in the drive assembly 113 being configured to have an input mechanism 115 output a first level of torque at the first output shaft 133 and to output a higher second level of torque at the second output shaft 143. In addition, to provide a more compact arrangement, given the respective diameters of the input, output and idler wheels, the rotational axis of the idler wheel 151 is offset from the longitudinally aligned rotational axes of the input wheel 131 and output wheel 141.

The provision of two different output shafts that provide different levels of torque facilitates use of the drill assembly attachment 110 with different rotatable devices that may require different torque or rotational speeds to be most effective. For instance, a given power drill assembly 140 may be capable of rotating an auger having a 6" diameter blade with sufficient torque to cut through ice in a relatively prompt manner. If so, then the auger could be connected to the first output shaft 133, which will be driven directly by and at the same rotational speed as the drill assembly 140. However, if the user instead were to select an auger having a 10" diameter blade, the torque required to cut the larger diameter hole through the ice would be greater, and the effort may be more successful if the auger having the larger diameter were connected to the second output shaft 143, which will rotate at a slower speed than the first output shaft 133, but with significantly greater torque. The aforementioned FIG. 35 provides a table listing sample test results of torque output of an illustrative power drill assembly attachment with different rotatable devices attached thereto. This demonstrates that torque requirements differ, depending on the rotatable device chosen. Therefore, the example drill assembly attachments having drive systems that provide two different output shafts that rotate at different rotational speeds and deliver different levels of torque are highly advantageous.

It will be appreciated that different input, output and idler wheel sizes may be used to provide different speed and torque ratios, as desired. In addition, an alternative configuration could have an input shaft that does not include an output shaft end that extends from the drive box 121, such that the drill assembly attachment would only present one output shaft, such as the second output shaft 143, without also providing the opportunity to use a direct drive offered by the input shaft 119 having an opposed portion that provides an output shaft 133.

As shown, the input wheel 131 and output wheel 141 may be constructed as gears or sprockets, for coupled interaction with a similarly constructed idler wheel 151 via meshing in a gear drive system. Alternatively, the gears may provide for coupling via a belt drive system, or the sprockets may provide for coupling via a chain drive system.

The third example drill assembly attachment 110 also includes a throttle 18 that is similar to the throttle 18 used on the first example drill assembly attachment 10. The throttle 18 is movable with respect to one or more of the drill mount 116 and the handle 14, and includes a first or user engaging portion **18*a* and a second or trigger engaging portion 18*b*. The user engaging end 18*a* is proximate a portion of the handle 14, for easy manipulation by a user, while the trigger engaging portion 18*b* is connected to the side plate 22 at an opening 39, which permits adjustment for different sized drill assemblies. The throttle 18 of the third example is configured and adjustable in a similar manner to that described above for the first example, so as to permit a user to securely grasp the handle 14 with both hands and to manipulate the user engaging portion 18*a* and thereby move the trigger 142 of the drill assembly 140 with the actuation member 58 of the trigger engaging portion 18*b*. Thus, the throttle 18 may be supported by one or more supports 52 and include an extender 56, an actuation member 58** and the corresponding connectors, as described with respect to the first example.

The third example drill assembly attachment 110 may be used in a method of using a power drill assembly 140 with a drill assembly attachment 110, where the drill assembly attachment 110 has a mounting member 116, a handle 14 extending from the mounting member 116, an adjustable throttle 18, a drive assembly 113 having an input mechanism 115 and an output mechanism 117 in operative communication with the input mechanism 115, the method including connecting a first portion of a power drill assembly 140, such as a chuck 112, to the input mechanism, connecting a second portion of the power drill assembly 140, such as a handle 144, to the mounting member 116 of the drill assembly attachment 110, and engaging the adjustable throttle 18 of the drill assembly attachment 110 with a trigger 142 of the power drill assembly 140 to rotate the input mechanism 115 and effect rotation of the output mechanism 117. The method may further include connecting a rotatable device to the output mechanism 117, such as an auger or other suitable rotatable device, as desired. Although the steps of the method are described in a particular order, it is contemplated that steps of the method may be performed in other orders, as desired.

In addition, the output mechanism 117 of the drill assembly attachment 110 used in the method also may include more than one output shaft, such as the first output shaft 133 and the second output shaft 143. Once again, each output shaft may be configured to receive a rotatable device, such as an auger or alternative rotatable device. With respect to the third example drill assembly attachment 110, as discussed above, each output shaft 133, 143 is configured to provide a different level of torque. The input mechanism 115 further includes an input shaft 119 connected to an input wheel 131 and the output mechanism 117 further includes an output shaft 143 connected to an output wheel 141, and the input wheel 131 and output wheel 141 further may be configured as gears or sprockets. Indeed, the input wheel 131 is operably coupled to the output wheel 143 via one or more of a gear drive system, a belt drive system and a chain drive system, and this example also includes an idler wheel 151 operably coupled to the input wheel 131 and the output wheel 141.

Turning to FIGS. 21-27, a fourth example drill assembly attachment 210 is configured for use with a power drill assembly, such as the drill assembly 140 of the third example, which has a standard keyless chuck 112, a handle 144 and trigger 142. The drill assembly attachment 210 includes a drill mount 216 and a drive assembly 213 connected to a handle 14. As with the first and third examples, the drill mount 216 may include a base plate 220 and a side plate 22 configured to receive the drill assembly 140, such as by using a bracket 26 extending through one or more openings 36, and bracket connectors 28, to removably secure the handle 144 of the drill assembly 140 adjacent the side plate 22.

Similar to the third example, the fourth example shows the side plate 22 connected to an optional elevated mount 223 that is connected to the base plate 220, such as by welding, but that otherwise may be connected to the base plate in a permanent or removable manner, as previously discussed. In this example, assembly connectors 50 may connect the side plate 22 to the elevated mount 223, by utilizing similar shaped openings as were used for connection of components in the first and third examples. The optional elevated mount 223 may provide for use of power drill assemblies having a larger configuration.

The fourth example drill assembly attachment 210 also includes a drive assembly 213, having a drive or input mechanism 215 and a driven or output mechanism 217 in operative communication with the input mechanism 215. In this example, the input mechanism 215 includes a shaft 219 that may be referred to as an input shaft or as an input shaft end that extends through an opening 232 in the base plate 220. This example further includes a housing or drive box 221, which is connected to one or more of the mounting member 216 and the handle 14. In this example, the drive box 221 is disposed below and connected to the base plate 220 portion of the mounting member 216, such as by use of removable fasteners about its perimeter. The base plate 220 also serves as a drive box cover. The drive box 221 houses portions of the input mechanism 215 and output mechanism 217 of the drive assembly 213.

The input mechanism 215 of this example includes an input wheel 231 that is connected to the input shaft 219, such as by use of a set screw or key, although the input wheel 231 and input shaft 219 alternatively may be formed as a monolithic, single continuous piece. As noted, the input shaft 219 includes an upper input shaft end that is configured to be removably connected to the chuck 112 of a drill assembly 140, which may be a keyless or keyed chuck. The input shaft end may have a non-cylindrical shape to prevent rotational slippage of the chuck 112 relative to the input shaft 219. In this example, the opposed end of the input shaft 219 provides a portion of the output mechanism 217, in the form of an output shaft end or first output shaft 233, which extends through the drive box 221, to which a rotatable device may be removably connected, such as an auger like that of the auger 60 from the first example drill assembly attachment 10, or the auger 560 described further herein with respect to a seventh example drill assembly attachment 510.

In this fourth example, the input shaft 219, input wheel 231 and first output shaft 233 are rotatably connected to the base plate or drive box cover 220 by a first bearing assembly 235, which is located above the input wheel 231 and adjacent the opening 232. The first bearing assembly 235 may utilize bearing components in the form of ball bearings or roller bearings, or as shown a bushing sleeve or the like, and may be fixedly or removably connected to the base plate 220, such as by being press fit or by use of fasteners or other suitable means of connection. A second bearing assembly 237 may be located on the opposed side or below the input wheel 231 and fixedly or removably connected to the drive box 221 by any of the aforementioned means of connection, and employing suitable bearing components, such as the bushing sleeve shown.

The output mechanism 217 of this example includes an output wheel 241 that is connected to a second output shaft 243, such as by use of a set screw or key, although the output wheel 241 and output shaft 243 alternatively may be formed as a monolithic, single continuous piece. The output shaft 243 is configured for removable connection to a rotatable device, such as an auger or the like. The output shaft 243 includes an upper end 249 that may be configured to be received in an opening of and rotatably connected to the base plate or drive box cover 220, such as by a first bearing assembly 245, or may be entirely concealed by the base plate 220. The first bearing assembly 245 may utilize bearing components and be connected to the base plate 220, as described previously with respect to the first bearing assembly 235 for the input mechanism 215. A second bearing assembly 247 may be located below the output wheel 241 and fixedly or removably connected to the drive box 221 by any of the aforementioned means of connection, and having suitable bearing components. The base plate 220 of this example includes a thicker central longitudinal region, permitting use of longer bushings in the bearing assemblies.

The fourth example in FIGS. 21-27 also includes an intermediate or idler mechanism 250 having an intermediate or idler wheel 251 that is connected to an intermediate or idler shaft 253, such as by use of a set screw or key, although the idler wheel 251 and idler shaft 253 alternatively may be formed as a monolithic, single continuous piece. The idler shaft 253 includes an upper end 259 that is configured to be received in an opening of and rotatably connected to the base plate or drive box cover 220 by a first bearing assembly 255, or may be entirely concealed by the base plate 220. The first bearing assembly 255 may utilize a bearing device and be connected to the base plate 220, as described previously with respect to the first bearing assembly 235 for the input mechanism 215. A second bearing assembly 257 may be located below the idler wheel 251 and fixedly or removably connected to the drive box 221 by any of the aforementioned means of connection, and having suitable bearing components. The idler wheel 251 is configured to be operably coupled to the input wheel 231 and the output wheel 241. This arrangement, which uses an idler wheel 251, causes the second output shaft 243 to rotate in the same direction as the first output shaft 233. As such, both output shafts may be configured to rotate in the appropriate direction to utilize a cutting edge of a rotatable device, such as an auger or other implement.

It also will be appreciated that the input mechanism 215 is configured to rotate at a first rotational speed and the output mechanism 217 is configured to rotate at a second rotational speed, with the first rotational speed being greater than the second rotational speed. This is due to the input wheel 231 being of a different size, which is smaller, than the output wheel 241. For instance, in the present example, the ratio of the first rotational speed of the input mechanism 215 at the input shaft 219 to the second rotational speed of the output mechanism 217 at the output shaft 243 is at least 2 to 1. The different sizes of the respective wheels also result in the drive assembly 213 being configured to have an input mechanism 215 output a first level of torque at the first output shaft 233 and to output a higher second level of torque at the second output shaft 243. In this example, diameters of the input, output and idler wheels are considerably less than in the third example and as such, the rotational axes of the input wheel 231, output wheel 241 and idler wheel 151 are longitudinally aligned while still fitting within the drive box 221. In addition, as explained for the third example, the provision of two different output shafts that provide different levels of torque, as also are present in the fourth example, facilitates use of the drill assembly attachment 210 with different rotatable devices that may require different torque or rotational speeds to be most effective.

It will be appreciated that different input, output and idler wheel sizes may be used to provide different speed and torque ratios, as desired. In addition, an alternative configuration could have an input shaft that does not include an output shaft end that extends from the drive box 221, such that the drill assembly attachment would only present one output shaft, such as the second output shaft 243, without also providing the opportunity to use a direct drive offered by the input shaft 219 having an opposed portion that provides an output shaft 233.

As shown, the input wheel 231 and output wheel 241 may be constructed as gears or sprockets, for coupled interaction with a similarly constructed idler wheel 251 via meshing in a gear drive system. Alternatively, the gears may provide for coupling via a belt drive system, or the sprockets may provide for coupling via a chain drive system.

The fourth example drill assembly attachment 210 also includes a throttle 18 that is similar to the throttle 18 used on the first example drill assembly attachment 10. The throttle 18 is movable with respect to one or more of the drill mount 216 and the handle 14, and includes a first or user engaging portion 18*a* and a second or trigger engaging portion 18*b*. The user engaging end 18*a* is proximate a portion of the handle 14, for easy manipulation by a user, while the trigger engaging portion 18*b* is connected to the side plate 22 at an opening 39, which permits adjustment for different sized drill assemblies. The throttle 18 of the third example is configured and adjustable in a similar manner to that described above for the first example, so as to permit a user to securely grasp the handle 14 with both hands and to manipulate the user engaging portion 18*a* and thereby move the trigger 142 of a drill assembly 140 with the actuation member 58 of the trigger engaging portion 18*b*. Thus, the throttle 18 may be supported by one or more supports 52 and include an extender 56, an actuation member 58 and the corresponding connectors, as described with respect to the first example.

The fourth example drill assembly attachment 210 may be used in a method of using a power drill assembly 140 with a drill assembly attachment 210, where the drill assembly attachment 210 has a mounting member 216, a handle 14 extending from the mounting member 216, an adjustable throttle 18, a drive assembly 213 having an input mechanism 215 and an output mechanism 217 in operative communication with the input mechanism 215, the method including connecting a first portion of a power drill assembly 140, such as a chuck 112, to the input mechanism, connecting a second portion of the power drill assembly 140, such as a handle 144, to the mounting member 216 of the drill assembly attachment 210, and engaging the adjustable throttle 18 of the drill assembly attachment 210 with a trigger 142 of the power drill assembly 140 to rotate the input mechanism 215 and effect rotation of the output mechanism 217. The method may further include connecting a rotatable device to the output mechanism 217, such as an auger or other suitable rotatable device, as desired. Although the steps of the method are described in a particular order, it is contemplated that steps of the method may be performed in other orders, as desired.

In addition, the output mechanism 217 of the drill assembly attachment 210 used in the method also may include more than one output shaft, such as the first output shaft 233 and the second output shaft 243. Once again, each output shaft may be configured to receive a rotatable device, such as an auger or alternative rotatable device. With respect to the fourth example drill assembly attachment 210, as discussed above, each output shaft 233, 243 is configured to provide a different level of torque. The input mechanism 215 further includes an input shaft 219 connected to an input wheel 231 and the output mechanism 217 further includes an output shaft 243 connected to an output wheel 241, and the input wheel 231 and output wheel 241 further may be configured as gears or sprockets. Indeed, the input wheel 231 is operably coupled to the output wheel 243 via one or more of a gear drive system, a belt drive system and a chain drive system, and this example also includes an idler wheel 251 operably coupled to the input wheel 231 and the output wheel 241.

Turning to FIGS. 28-34, a fifth example drill assembly attachment 310 is configured for use with a power drill assembly, such as the drill assembly 140 previously described with the third example, which has a standard keyless chuck 112, a handle 144 and trigger 142. The drill assembly attachment 310 includes a drill mount 316 and a drive assembly 313 connected to a handle 14. As with the previous examples, the drill mount 316 may include a base plate 320 and a side plate 22 configured to receive the drill assembly 140, such as by using a bracket 26 of the prior examples extending through one or more openings 36, and bracket connectors 28 of the prior examples, to removably secure the handle 144 of the drill assembly 140 adjacent the side plate 22.

Similar to the third example, the fifth example shows the side plate 22 connected to an optional elevated mount 323 that is connected to the base plate 320, such as by welding, but that otherwise may be connected to the base plate in a permanent or removable manner, as previously discussed. In this example, assembly connectors 50 may connect the side plate 22 to the elevated mount 323, by utilizing similar shaped openings as were used for connection of components in the first and third examples. The optional elevated mount 323 may provide for use of power drill assemblies having a larger configuration.

The fifth example drill assembly attachment 310 also includes a drive assembly 313, having a drive or input mechanism 315 and a driven or output mechanism 317 in operative communication with the input mechanism 315. In this example, the input mechanism 315 includes a shaft 319 that may be referred to as an input shaft or as an input shaft end that extends through an opening 332 in the base plate 320. This example further includes a housing or drive box 321, which is connected to one or more of the mounting member 316 and the handle 14. In this example, the drive box 321 is disposed below and connected to the base plate 320 portion of the mounting member 316, such as by use of removable fasteners about its perimeter. The base plate 320 also serves as a drive box cover. The drive box 321 houses portions of the input mechanism 315 and output mechanism 317 of the drive assembly 313.

The input mechanism 315 of this example includes an input wheel 331 that is connected to the input shaft 319, such as by use of a set screw or key, although the input wheel 331 and input shaft 319 alternatively may be formed as a monolithic, single continuous piece. As noted, the input shaft 319 includes an upper input shaft end that is configured to be removably connected to the chuck 112 of a drill assembly 140, which may be a keyless or keyed chuck. The input shaft end may have a non-cylindrical shape to prevent rotational slippage of the chuck 112 relative to the input shaft 319. In this example, the opposed end of the input shaft 319 provides a portion of the output mechanism 317, in the form of an output shaft end or first output shaft 333, which extends through the drive box 321, to which a rotatable device may be removably connected, such as an auger like that of the auger 60 from the first example drill assembly attachment 10, or the auger 560 described further herein with respect to a seventh example drill assembly attachment 510.

In this fifth example, the input shaft 319, input wheel 331 and first output shaft 333 are rotatably connected to the base plate or drive box cover 320 by a first bearing assembly 335, which is located above the input wheel 331 and adjacent the opening 332. The first bearing assembly 335 may utilize bearing components in the form of ball bearings or roller bearings, or as shown in this example in the form as a bushing sleeve or the like, and may be fixedly or removably connected to the base plate 320, such as by being press fit or by use of fasteners or other suitable means of connection. A second bearing assembly 337 may be located on the opposed side or below the input wheel 331 and fixedly or removably connected to the drive box 321 by any of the aforementioned means of connection, and employing suitable bearing components, such as the bushing sleeve shown. The drive box 321 of this example includes a thicker central longitudinal region that extends downward on the exterior, permitting use of longer bushings in the bearing assemblies.

The output mechanism 317 of this example includes an output wheel 341 that is connected to a second output shaft 343, such as by use of a set screw or key, although the output wheel 341 and output shaft 343 alternatively may be formed as a monolithic, single continuous piece. The output shaft 343 is configured for removable connection to a rotatable device, such as an auger or the like. The output shaft 343 includes an upper end 349 that may be configured to be received in an opening of and rotatably connected to the base plate or drive box cover 320, such as by a first bearing assembly 345, or may be entirely concealed by the base plate 320. The first bearing assembly 345 may utilize bearing components and be connected to the base plate 320, as described previously with respect to the first bearing assembly 335 for the input mechanism 315. A second bearing assembly 347 may be located below the output wheel 341 and fixedly or removably connected to the drive box 321 by any of the aforementioned means of connection, and having suitable bearing components.

The fifth example in FIGS. 28-34 also includes an intermediate or idler mechanism 350 having an intermediate or idler wheel 351 that is connected to an intermediate or idler shaft 353, such as by use of a set screw or key, although the idler wheel 351 and idler shaft 353 alternatively may be formed as a monolithic, single continuous piece. The idler shaft 353 includes an upper end 359 that is configured to be received in an opening of and rotatably connected to the base plate or drive box cover 320 by a first bearing assembly 355, or may be entirely concealed by the base plate 320. The first bearing assembly 355 may utilize a bearing device and be connected to the base plate 320, as described previously with respect to the first bearing assembly 335 for the input mechanism 315. A second bearing assembly 357 may be located below the idler wheel 351 and fixedly or removably connected to the drive box 321 by any of the aforementioned means of connection, and having suitable bearing components. The idler wheel 351 is configured to be operably coupled to the input wheel 331 and the output wheel 341. This arrangement, which uses an idler wheel 351, causes the second output shaft 343 to rotate in the same direction as the first output shaft 333. As such, both output shafts may be configured to rotate in the appropriate direction to utilize a cutting edge of a rotatable device, such as an auger or other implement.

It also will be appreciated that the input mechanism 315 is configured to rotate at a first rotational speed and the output mechanism 317 is configured to rotate at a second rotational speed, with the first rotational speed being greater than the second rotational speed. This is due to the input wheel 331 being of a different size, which is smaller, than the output wheel 341. For instance, in the present example, the ratio of the first rotational speed of the input mechanism 315 at the input shaft 319 to the second rotational speed of the output mechanism 317 at the output shaft 343 is at least 2 to 1. The different sizes of the respective wheels also result in the drive assembly 313 being configured to have an input mechanism 315 output a first level of torque at the first output shaft 333 and to output a higher second level of torque at the second output shaft 343. In this example, diameters of the input, output and idler wheels are considerably less than in the third example and as such, the rotational axes of the input wheel 331, output wheel 341 and idler wheel 351 are longitudinally aligned while still fitting within the drive box 321. In addition, as explained for the third example, the provision of two different output shafts that provide different levels of torque, as also are present in the fifth example, facilitates use of the drill assembly attachment 310 with different rotatable devices that may require different torque or rotational speeds to be most effective.

It will be appreciated that different input, output and idler wheel sizes may be used to provide different speed and torque ratios, as desired. In addition, an alternative configuration could have an input shaft that does not include an output shaft end that extends from the drive box 321, such that the drill assembly attachment would only present one output shaft, such as the second output shaft 343, without also providing the opportunity to use a direct drive offered by the input shaft 319 having an opposed portion that provides an output shaft 333.

As shown, the input wheel 331 and output wheel 341 may be constructed as gears or sprockets, for coupled interaction with a similarly constructed idler wheel 351 via meshing in a gear drive system. Alternatively, the gears may provide for coupling via a belt drive system, or the sprockets may provide for coupling via a chain drive system.

The fifth example drill assembly attachment 310 also includes a throttle 18 that is similar to the throttle 18 used on the first example drill assembly attachment 10. The throttle 18 is movable with respect to one or more of the drill mount 216 and the handle 14, and includes a first or user engaging portion **18*a* and a second or trigger engaging portion 18*b*. The user engaging end 18*a* is proximate a portion of the handle 14, for easy manipulation by a user, while the trigger engaging portion 18*b* is connected to the side plate 22 at an opening 39, which permits adjustment for different sized drill assemblies. The throttle 18 of the third example is configured and adjustable in a similar manner to that described above for the first example, so as to permit a user to securely grasp the handle 14 with both hands and to manipulate the user engaging portion 18***a* and thereby move the trigger 142 of a drill assembly 140 with the actuation member 58 of the trigger engaging portion 18*b*. Thus, the throttle 18 may be supported by one or more supports 52 and include an extender 56, an actuation member 58 and the corresponding connectors, as described with respect to the first example.

The fifth example drill assembly attachment 310 may be used in a method of using a power drill assembly 140 with a drill assembly attachment 310, where the drill assembly attachment 310 has a mounting member 316, a handle 14 extending from the mounting member 316, an adjustable throttle 18, a drive assembly 313 having an input mechanism 315 and an output mechanism 317 in operative communication with the input mechanism 315, the method including connecting a first portion of a power drill assembly 140, such as a chuck 112, to the input mechanism, connecting a second portion of the power drill assembly 140, such as a handle 144, to the mounting member 316 of the drill assembly attachment 310, and engaging the adjustable throttle 18 of the drill assembly attachment 310 with a trigger 142 of the power drill assembly 140 to rotate the input mechanism 315 and effect rotation of the output mechanism 317. The method may further include connecting a rotatable device to the output mechanism 317, such as an auger or other suitable rotatable device, as desired. Although the steps of the method are described in a particular order, it is contemplated that steps of the method may be performed in other orders, as desired.

In addition, the output mechanism 317 of the drill assembly attachment 310 used in the method also may include more than one output shaft, such as the first output shaft 333 and the second output shaft 343. Once again, each output shaft may be configured to receive a rotatable device, such as an auger or alternative rotatable device. With respect to the fourth example drill assembly attachment 310, as discussed above, each output shaft 333, 343 is configured to provide a different level of torque. The input mechanism 315 further includes an input shaft 319 connected to an input wheel 331 and the output mechanism 317 further includes an output shaft 343 connected to an output wheel 341, and the input wheel 331 and output wheel 341 further may be configured as gears or sprockets. Indeed, the input wheel 331 is operably coupled to the output wheel 343 via one or more of a gear drive system, a belt drive system and a chain drive system, and this example also includes an idler wheel 351 operably coupled to the input wheel 331 and the output wheel 341.

Turning to FIGS. 36-40, a sixth example drill assembly attachment 410 is configured for use with a power drill assembly, such as the drill assembly 140 of the third example, which has a standard keyless chuck 112, a handle 144 and trigger 142. The drill assembly attachment 410 includes a drill mount 416 and a drive assembly 413 connected to a handle 14. The drill mount 416 may include a base plate 420 and a side plate 422 configured to receive the drill assembly 140, such as by using a bracket 26 extending through one or more openings 436, and bracket connectors 28, to removably secure the handle 144 of the drill assembly 140 adjacent the side plate 422.

The sixth example shows the side plate 422 being taller than the first example side plate 22, such that it may still accommodate larger power drill assemblies without requiring an optional elevated mount. The side plate 422 may be connected to the base plate 420 in a manner similar to the first example, such as by removable connectors 50, which would permit some adjustment of the positioning of the side plate 422 relative to the base plate 420. Alternatively, the side plate 422 may be permanently connected to the base plate 420, such as by welding or other suitable means of connection, as previously discussed. It also will be appreciated that the taller side plate 422 could be used in any of the prior examples, as well, either with or without an elevated mount shown in a prior example.

The sixth example drill assembly attachment 410 also includes a drive assembly 413, having a drive or input mechanism 415 and a driven or output mechanism 417 in operative communication with the input mechanism 415. In this example, the input mechanism 415 includes a shaft 419 that may be referred to as an input shaft or as an input shaft end that extends through an opening 432 in the base plate 420. This example further includes a housing or drive box 421, which is connected to one or more of the mounting member 416 and the handle 14. In this example, the drive box 421 is disposed below and connected to the base plate 420 portion of the mounting member 416, such as by use of removable fasteners along its sides. The base plate 420 also serves as a drive box cover. The drive box 421 houses portions of the input mechanism 415 and output mechanism 417 of the drive assembly 413.

The input mechanism 415 of this example includes an input wheel 431 that is connected to the input shaft 419, such as by use of a set screw or key, although the input wheel 431 and input shaft 419 alternatively may be formed as a monolithic, single continuous piece. As noted, the input shaft 419 includes an upper input shaft end that is configured to be removably connected to the chuck 112 of a drill assembly 140, which may be a keyless or keyed chuck. The input shaft end may have a non-cylindrical shape to prevent rotational slippage of the chuck 112 relative to the input shaft 419. In this example, the opposed end of the input shaft 419 provides a portion of the output mechanism 417, in the form of an output shaft end or first output shaft 433, which extends through the drive box 421, to which a rotatable device may be removably connected, such as an auger like that of the auger 60 from the first example drill assembly attachment 10, or the auger 560 described further herein with respect to a seventh example drill assembly attachment 510.

In this sixth example, the input shaft 419, input wheel 431 and first output shaft 433 are rotatably connected to the base plate or drive box cover 420 by a first bearing assembly 435, which is located above the input wheel 431 and adjacent the opening 432. The first bearing assembly 435 may utilize bearing components in the form of ball bearings or roller bearings, or as shown a bushing sleeve or the like, and may be fixedly or removably connected to the base plate 420, such as by being press fit or by use of fasteners or other suitable means of connection. A second bearing assembly 437 may be located on the opposed side or below the input wheel 431 and fixedly or removably connected to the drive box 421 by any of the aforementioned means of connection, and employing suitable bearing components, such as the bushing sleeve shown.

The output mechanism 417 of this example includes an output wheel 441 that is connected to a second output shaft 443, such as by use of a set screw or key, although the output wheel 441 and output shaft 443 alternatively may be formed as a monolithic, single continuous piece. The output shaft 443 is configured for removable connection to a rotatable device, such as an auger or the like. The output shaft 443 includes an upper end 449 that may be configured to be received in an opening of and rotatably connected to the base plate or drive box cover 420, such as by a first bearing assembly 445, or may be entirely concealed by the base plate 420. The first bearing assembly 445 may utilize bearing components and be connected to the base plate 420, as described previously with respect to the first bearing assembly 435 for the input mechanism 415. A second bearing assembly 447 may be located below the output wheel 441 and fixedly or removably connected to the drive box 421 by any of the aforementioned means of connection, and having suitable bearing components. The base plate 420 of this example includes a thicker bottom wall, permitting use of longer bushings in the bearing assemblies.

The sixth example in FIGS. 36-40 has the input wheel 431 configured to be operably coupled to the output wheel 441. This arrangement uses a flexible drive member 451, such as a chain or belt, which causes the second output shaft 443 to rotate in the same direction as the first output shaft 433. As such, both output shafts may be configured to rotate in the appropriate direction to utilize a cutting edge of a rotatable device, such as auger or other implement.

It also will be appreciated that the input mechanism 415 is configured to rotate at a first rotational speed and the output mechanism 417 is configured to rotate at a second rotational speed, with the first rotational speed being greater than the second rotational speed. This is due to the input wheel 431 being of a different size, which is smaller, than the output wheel 441. For instance, in the present example, the ratio of the first rotational speed of the input mechanism 415 at the input shaft 419 to the second rotational speed of the output mechanism 417 at the output shaft 443 is at least 2 to 1. The different sizes of the respective wheels also result in the drive assembly 413 being configured to have an input mechanism 415 output a first level of torque at the first output shaft 433 and to output a higher second level of torque at the second output shaft 443. In this example, the diameters of the input and output wheels are of similar size to those of the third example but by not using an idler wheel, the drive system 413 can fit within a similar sized drive box 421. With this arrangement, the rotational axes of the input wheel 431 and output wheel 441 are longitudinally aligned, while still fitting within the drive box 421. In addition, as explained with respect to the third example, the sixth example drill assembly attachment 410 provides two different output shafts that deliver different levels of torque and facilitate use of the drill assembly attachment 410 with different rotatable devices that may require different torque or rotational speeds to be most effective.

It will be appreciated that different input and output wheel sizes may be used to provide different speed and torque ratios, as desired. In addition, an alternative configuration could have an input shaft that does not include an output shaft end that extends from the drive box 421, such that the drill assembly attachment would only present one output shaft, such as the second output shaft 443, without also providing the opportunity to use a direct drive offered by the input shaft 419 having an opposed portion that provides an output shaft 433.

As shown, the input wheel 431 and output wheel 441 may be constructed as gears or sprockets, for coupled interaction with a flexible drive member 451. The flexible drive member 451 may be configured as a chain or belt, which would provide coupling of the corresponding input and output wheels, and provide a chain drive system or a belt drive system. Alternatively, the wheels could be configured as gears and the drill assembly attachment could utilize an idler wheel to transmit the rotational force from the input wheel to the output wheel via a gear drive system.

The sixth example drill assembly attachment 410 also includes a throttle 418 that is similar to the throttle 18 used on the first example drill assembly attachment 10, but includes further adjustability to accommodate a greater variety of sizes of power drill assemblies. The throttle 418 is movable with respect to one or more of the drill mount 416 and the handle 14, and includes a first or user engaging portion **418*a* and a second or trigger engaging portion 418*b*. The user engaging end 418*a* is proximate a portion of the handle 14, for easy manipulation by a user, while the trigger engaging portion 418*b* is connected to the side plate 422 at an opening 39, which permits adjustment for different sized drill assemblies. The throttle 418 of the sixth example is configured and adjustable in a similar manner to that described above for the first example, so as to permit a user to securely grasp the handle 14 with both hands and to manipulate the user engaging portion 418*a* and thereby move the trigger 142 of a drill assembly 140 with the trigger engaging portion 418*b*. Thus, the throttle 418 may be supported by one or more supports 52 and includes an adjustable extender 456 and an actuation member 458. As with the throttles 18 of the earlier examples, selective actuation of the user engaging portion 418*a* will cause the actuation member 458 of the trigger engaging portion 418*b* to press or release the trigger 142 of the drill assembly 140. Similarly to the prior examples, linear movement of the user engaging portion 418*a* causes rotational movement of the actuation member 458**, although other actuation methods may be employed with any of the examples.

The extender 456 of the sixth example drill assembly attachment 410 is adjustable and includes a first extender portion **456*a* that is connected to a second extender portion 456*b*. Although other configurations may be used, in this example, the first extender portion 456*a* extends vertically and the second extender portion 456*b* includes a vertical portion that is connected to the first extender portion 456*a* and permits adjustment of the vertical length of the extender 456. While use of two fasteners 50** are shown connecting the first and second extender portions, other suitable means of connection could be used.

The sixth example drill assembly attachment 410 may be used in a method of using a power drill assembly 140 with a drill assembly attachment 410, where the drill assembly attachment 410 has a mounting member 416, a handle 14 extending from the mounting member 416, an adjustable throttle 418, a drive assembly 413 having an input mechanism 415 and an output mechanism 417 in operative communication with the input mechanism 415, the method including connecting a first portion of a power drill assembly 140, such as a chuck 112, to the input mechanism, connecting a second portion of the power drill assembly 140, such as a handle 144, to the mounting member 416 of the drill assembly attachment 410, and engaging the adjustable throttle 418 of the drill assembly attachment 410 with a trigger 142 of the power drill assembly 140 to rotate the input mechanism 415 and effect rotation of the output mechanism 417. The method may further include connecting a rotatable device to the output mechanism 417, such as an auger or other suitable rotatable device, as desired. Although the steps of the method are described in a particular order, it is contemplated that steps of the method may be performed in other orders, as desired.

In addition, the output mechanism 417 of the drill assembly attachment 410 used in the method also may include more than one output shaft, such as the first output shaft 433 and the second output shaft 443. Once again, each output shaft may be configured to receive a rotatable device, such as an auger or alternative rotatable device. With respect to the sixth example drill assembly attachment 410, as discussed above, each output shaft 433, 443 is configured to provide a different level of torque. The input mechanism 415 further includes an input shaft 419 connected to an input wheel 431 and the output mechanism 417 further includes an output shaft 443 connected to an output wheel 441, and the input wheel 431 and output wheel 441 further may be configured as gears or sprockets. Indeed, the input wheel 431 is operably coupled to the output wheel 443 via a flexible drive member 451, such as a chain or belt, so as to provide a chain drive system or a belt drive system which operably couples the input wheel 431 and the output wheel 441.

Turning to FIGS. 41-47, a seventh example drill assembly attachment 510 is configured for use with a power drill assembly, such as the drill assembly 140 of the third example, which has a standard keyless chuck 112, a handle 144 and trigger 142. The drill assembly attachment 510 includes a drill mount 516 and a drive assembly 513 connected to a handle 14. The drill mount 516 may include a base plate 520 and a side plate 422 configured to receive the drill assembly 140, such as by using a bracket 26 extending through one or more openings 436, and bracket connectors 28, to removably secure the handle 144 of the drill assembly 140 adjacent the side plate 422, similarly to the mounting with the sixth example drill assembly attachment 410.

The seventh example utilizes the side plate 422 of the sixth example, which is taller than the first example side plate 22, such that it may still accommodate larger power drill assemblies without requiring an optional elevated mount. The side plate 422 may be connected to the base plate 520 in a manner similar to the first example, such as by removable connectors 50, which would permit some adjustment of the positioning of the side plate 422 relative to the base plate 520. Alternatively, the side plate 422 may be permanently connected to the base plate 520, such as by welding or other suitable means of connection, as previously discussed. It also will be appreciated that the taller side plate 422 could be used in any of the prior examples, as well, either with or without an elevated mount shown in a prior example.

Figure 41:
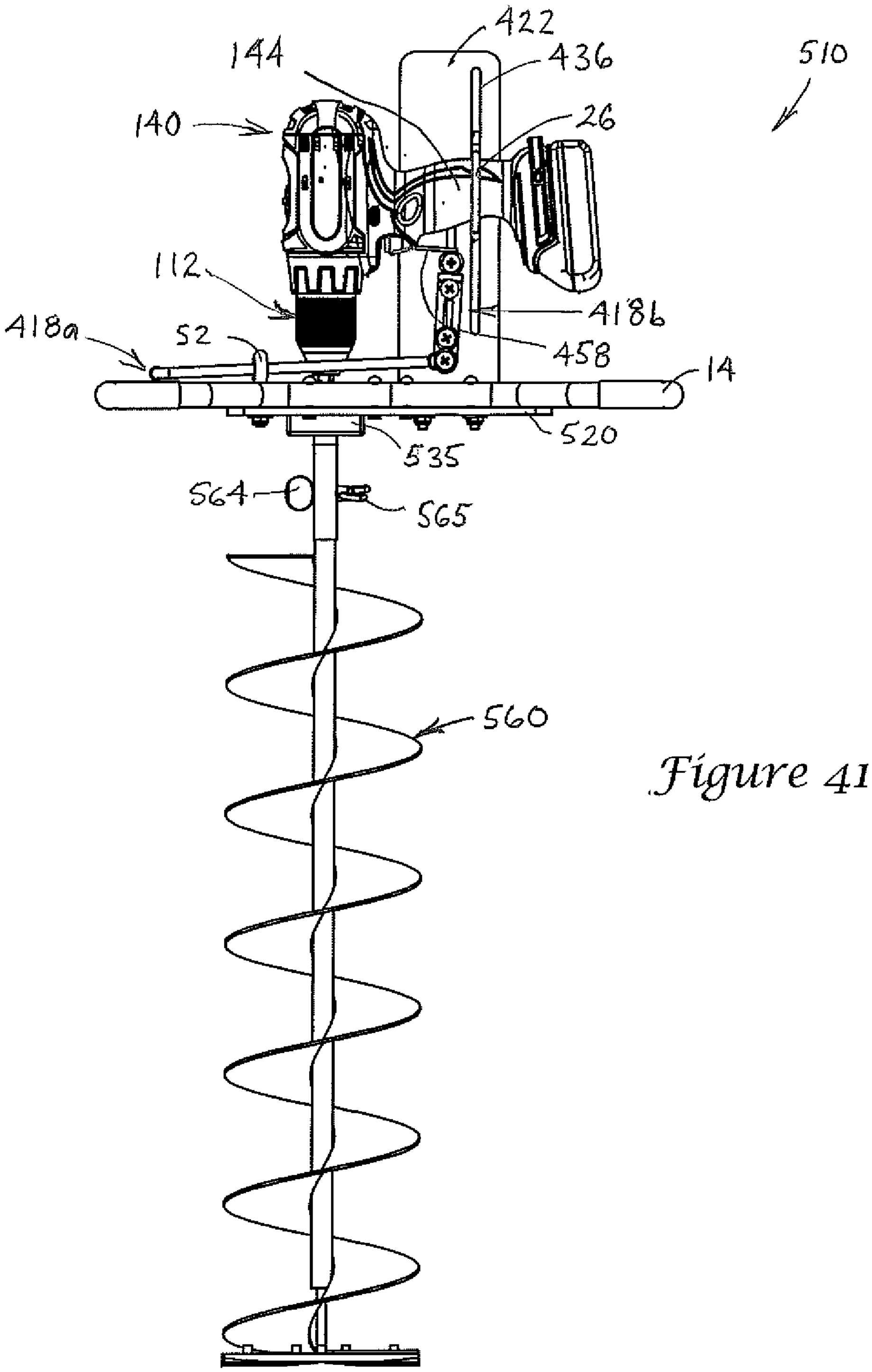
FIG. 41 is a schematic side view of a seventh example illustrative power drill assembly attachment, an illustrative power drill assembly, and an illustrative rotatable device.
Figure 42:
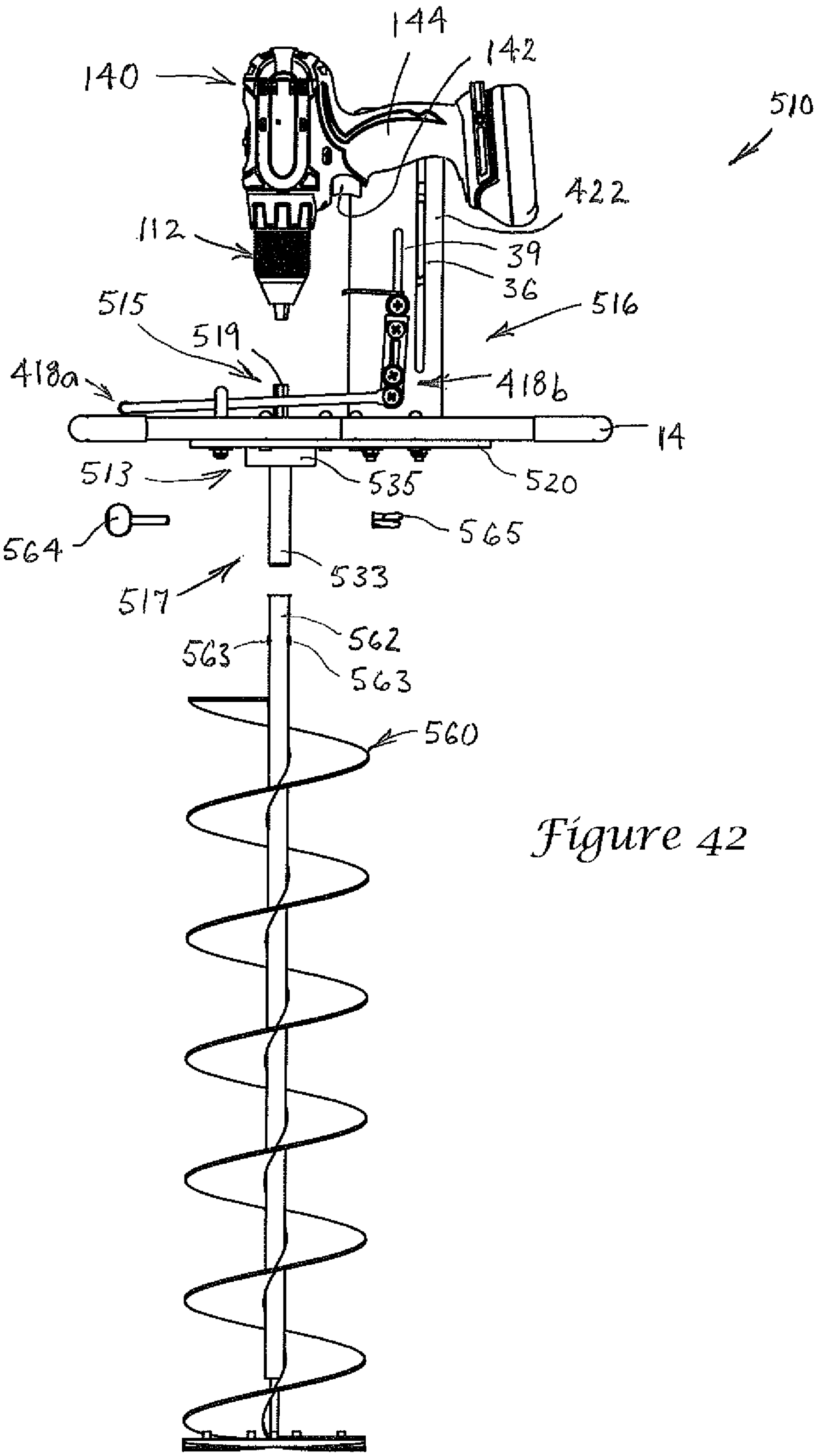
FIG. 42 is a schematic partially exploded side view of the illustrative power drill assembly attachment, illustrative power drill assembly, and illustrative rotatable device of FIG. 41.
Figure 43:
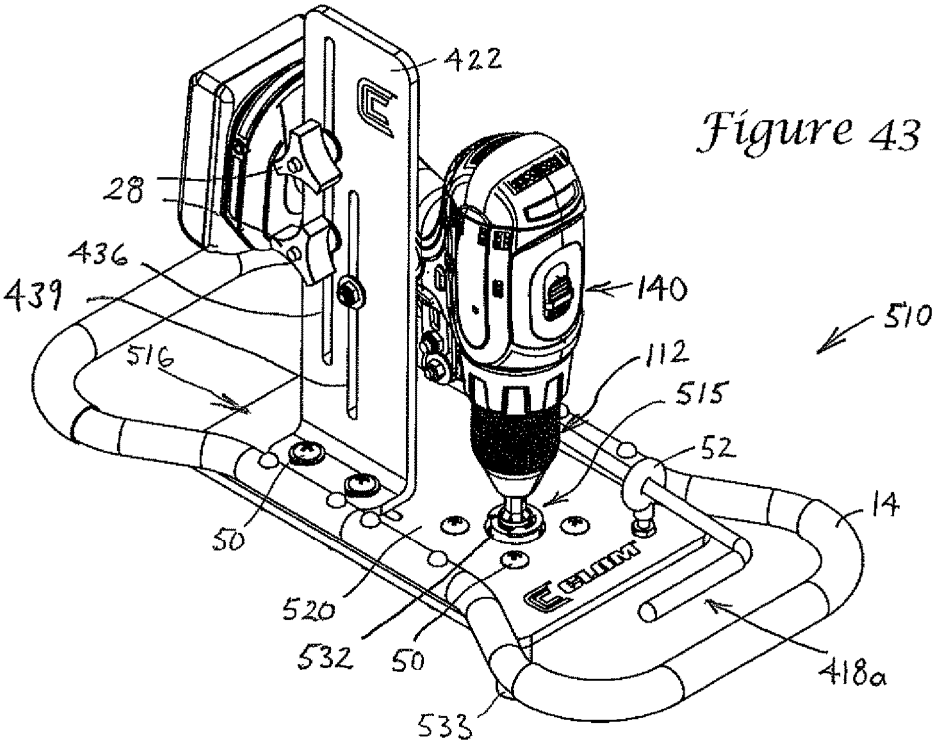
FIG. 43 is a schematic perspective view from above of the illustrative power drill assembly attachment and illustrative power drill assembly of FIG. 41.
Figure 44:
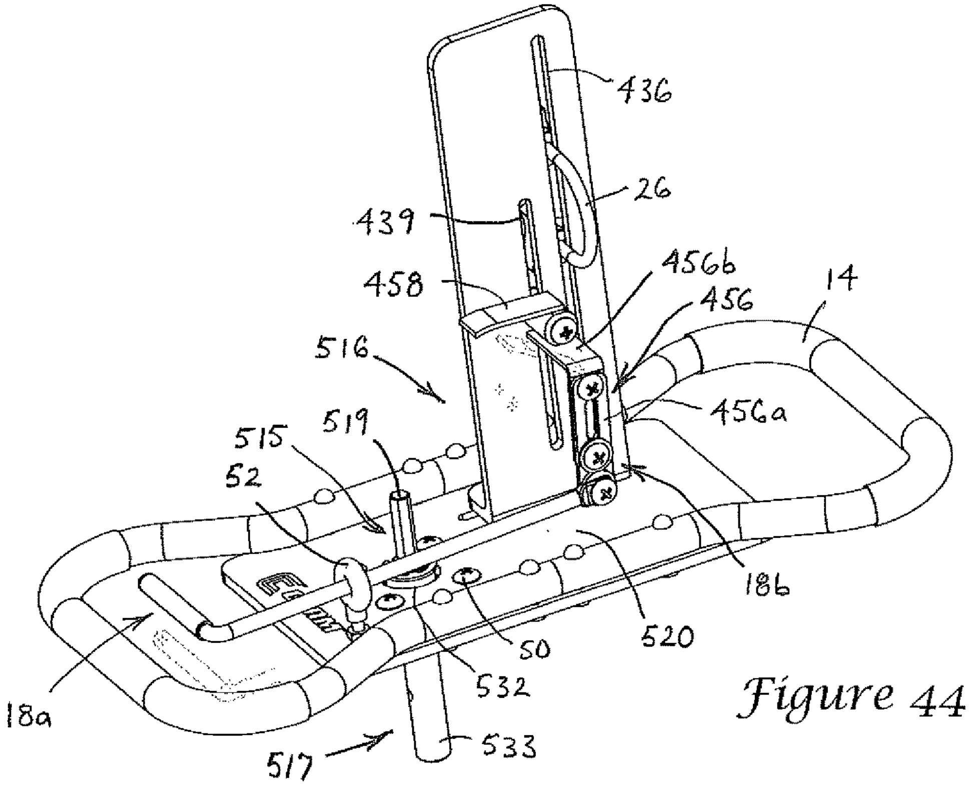
FIG. 44 is a schematic perspective view from above of the illustrative power drill assembly attachment of FIG. 43.
Figure 45:
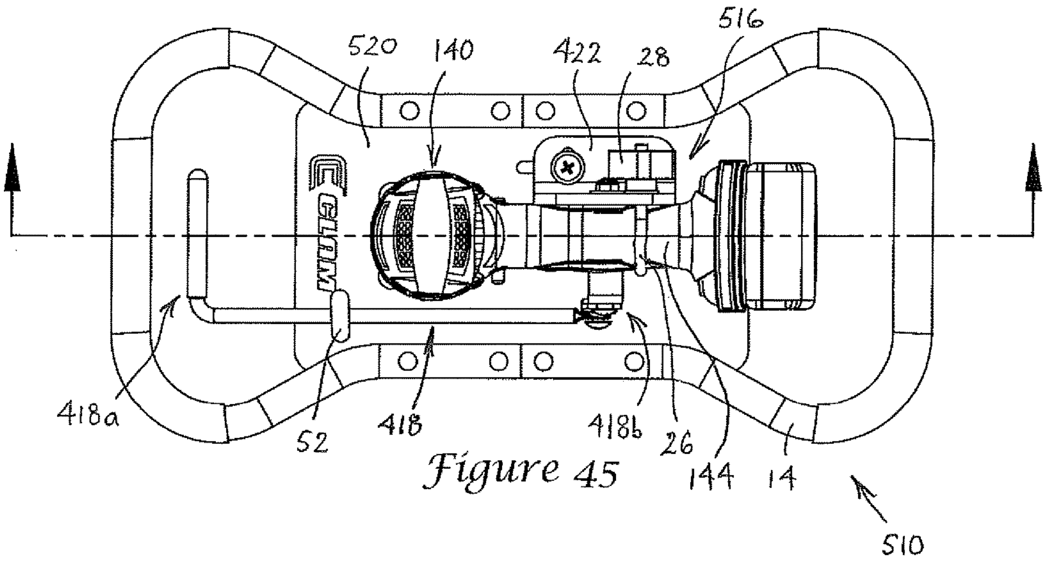
FIG. 45 is a schematic top view of the illustrative power drill assembly attachment and illustrative power drill assembly of FIG. 43.
Figure 46:
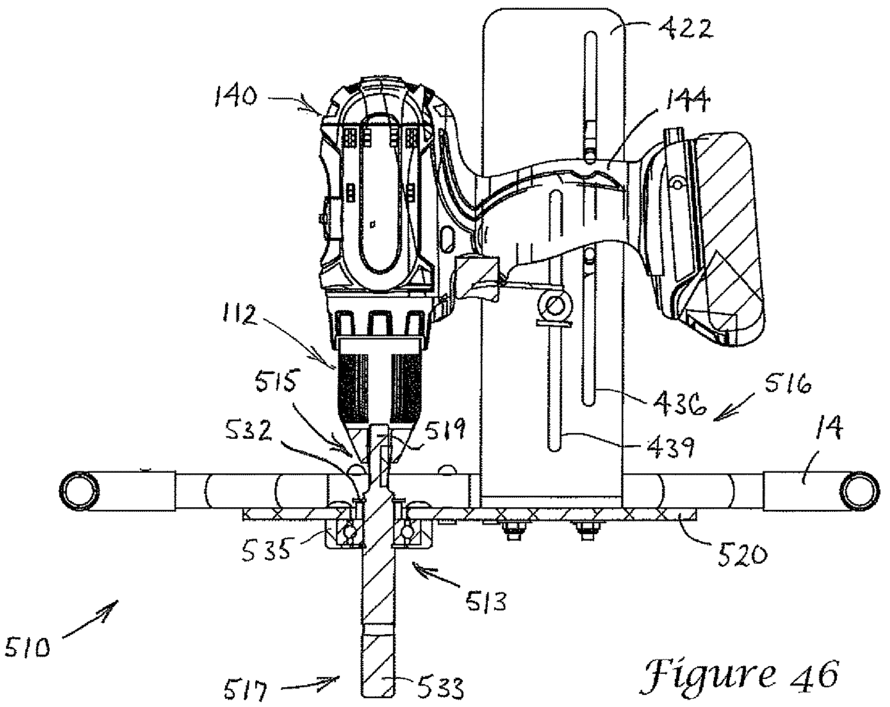
FIG. 46 is a schematic cross-sectional side view of the illustrative power drill assembly attachment and illustrative power drill assembly at the section line in FIG. 45.
Figure 47:
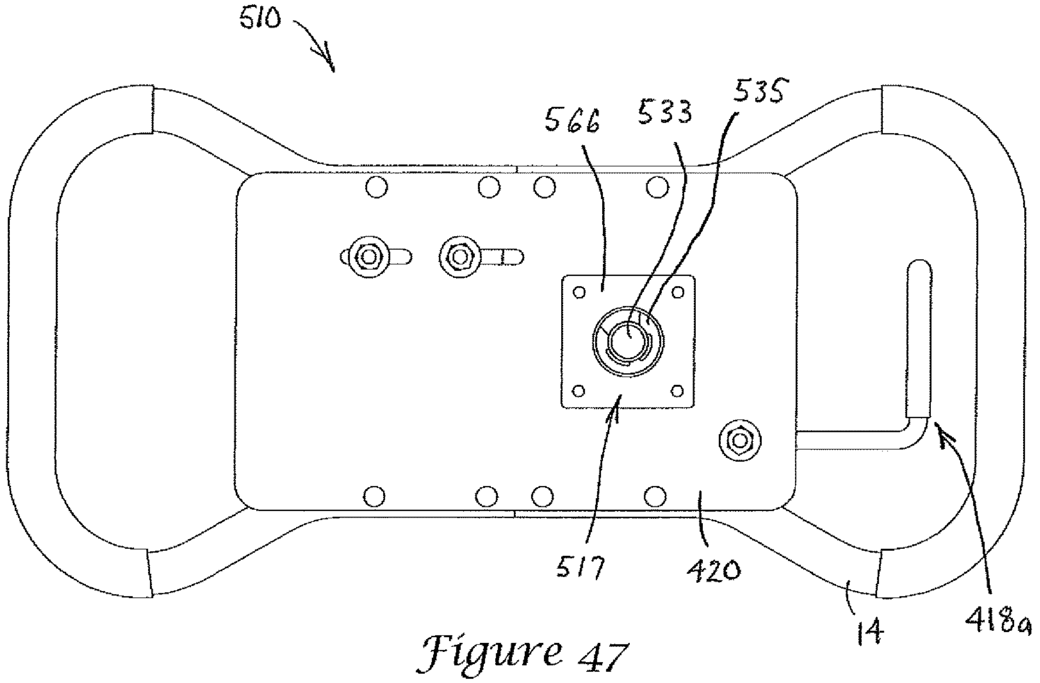
FIG. 47 is a schematic bottom view of the illustrative power drill assembly attachment of FIG. 43.

The seventh example drill assembly attachment 510 also includes a drive assembly 513, having a drive or input mechanism 515 and a driven or output mechanism 517 in operative communication with the input mechanism 515. In this example, the input mechanism 515 includes a shaft 519 that may be referred to as an input shaft or as an input shaft end that extends through an opening 532 in the base plate 520. As with the first example, this example does not include a drive box or wheels, and instead the input shaft 519 includes an upper input shaft end that is configured to be removably connected to the chuck 112 of a drill assembly 140, which may be a keyless or keyed chuck. The opposed end of the input shaft 519 provides a portion of the output mechanism 517, in the form of an output shaft end or output shaft 533. The input shaft end may have a non-cylindrical shape to prevent rotational slippage of the chuck 112 relative to the input shaft 519. The output shaft 533 may be connected to a rotatable device, such as an auger 560 or another suitable implement for drilling, mixing or other purposes. For example, as shown in FIGS. 41 and 42, the auger 560 may include a cylindrical upper portion 562 that slidably receives an output shaft of a drill assembly attachment. The cylindrical upper portion 562 may include openings through which a fastener 563 may be inserted, so as to pass through and removably connect the auger and the output shaft. The fastener may include, for example, a thumb screw 564 and wing nut 565, or other suitable structures and components may be used to connect an auger or other rotatable device to the output shaft.

In this seventh example, the input shaft 519 is rotatably connected to the base plate 520 by a bearing assembly 535, which is connected to the base plate 520 adjacent the opening 532. The bearing assembly 535 may utilize bearing components in the form of ball bearings, as shown, or roller bearings a bushing sleeve or the like. The bearing assembly 535 also may be fixedly or removably connected to the base plate 520, and is shown having a flange 566 connected to the base plate 520 by use of fasteners 50, although alternative means of connection, such as by being press fit or by use of fasteners or other suitable means of connection may be utilized.

The seventh example drill assembly attachment 510 also includes a throttle, which is shown as the same throttle 418 of the sixth example drill assembly attachment 410. Thus, the throttle 418 is movable with respect to one or more of the drill mount 516 and the handle 14, and includes a first or user engaging portion **418*a* and a second or trigger engaging portion 418*b*. The user engaging end 418*a* is proximate a portion of the handle 14, for easy manipulation by a user, while the trigger engaging portion 418*b* is connected to the side plate 422 at an opening 39, which permits adjustment for different sized drill assemblies. The throttle 418 of the seventh example is configured and adjustable in a similar manner to that described above for the first example, so as to permit a user to securely grasp the handle 14 with both hands and to manipulate the user engaging portion 418*a* and thereby move the trigger 142 of a drill assembly 140 with the trigger engaging portion 418*b*. Thus, the throttle 418 may be supported by one or more supports 52 and includes an adjustable extender 456 and an actuation member 458. As with the throttles 18 of the earlier examples, selective actuation of the user engaging portion 418*a* will cause the actuation member 458 of the trigger engaging portion 418*b* to press or release the trigger 142 of the drill assembly 140. Similarly to the prior examples, linear movement of the user engaging portion 418*a* causes rotational movement of the actuation member 458**, although other actuation methods may be employed with any of the examples.

The extender 456 of the seventh example drill assembly attachment 510 is adjustable and includes a first extender portion **456*a* that is connected to a second extender portion 456*b*. Although other configurations may be used, as with the sixth example, in this example, the first extender portion 456*a* extends vertically and the second extender portion 456*b* includes a vertical portion that is connected to the first extender portion 456*a* and permits adjustment of the vertical length of the extender 456. While use of two fasteners 50** are shown connecting the first and second extender portions, other suitable means of connection could be used.

The seventh example drill assembly attachment 510 may be used in a method of using a power drill assembly 140 with a drill assembly attachment 510, where the drill assembly attachment 510 has a mounting member 516, a handle 14 extending from the mounting member 516, an adjustable throttle 418, a drive assembly 513 having an input mechanism 515 and an output mechanism 517 in operative communication with the input mechanism 515, the method including connecting a first portion of a power drill assembly 140, such as a chuck 112, to the input mechanism, connecting a second portion of the power drill assembly 140, such as a handle 144, to the mounting member 516 of the drill assembly attachment 510, and engaging the adjustable throttle 418 of the drill assembly attachment 510 with a trigger 142 of the power drill assembly 140 to rotate the input mechanism 515 and effect rotation of the output mechanism 517. The method may further include connecting a rotatable device to the output mechanism 517, such as an auger 560 or other suitable rotatable device, as desired. Although the steps of the method are described in a particular order, it is contemplated that steps of the method may be performed in other orders, as desired.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

The invention claimed is:

1. A drill assembly attachment for connection to a power drill assembly having a handle and a trigger, the drill assembly attachment comprising:

a power drill assembly mount and a drive assembly connected to a handle;

the handle having two handle gripping portions being parallel and laterally spaced apart;

the power drill assembly mount further comprising a base plate positioned between and extending laterally toward the laterally spaced apart two handle gripping portions, the power drill assembly mount being connected to the handle of the drill assembly attachment and having a power drill assembly handle connector;

the power drill assembly handle connector further comprising a side plate connected to and extending upward from the base plate and at least one bracket connected to the side plate, wherein the at least one bracket is configured to connect the handle of the power drill assembly to the side plate;

the drive assembly further comprising an input mechanism that is rotatably driven by the power drill assembly when the power drill assembly is received by the power drill assembly mount and an output mechanism in operative communication with the input mechanism;

a throttle having a user engaging portion and a trigger engaging portion connected respectively to opposite ends of an elongated portion and being movable with respect to one or more of the power drill assembly mount and the handle; and wherein the throttle user engaging portion is proximate one of the two handle gripping portions and the trigger engaging portion is proximate the trigger of the power drill assembly when the power drill assembly is received by the power drill assembly mount.

2. The drill assembly attachment of claim 1, wherein the input mechanism is configured to be connected to a standard keyless or keyed chuck of a power drill assembly.

3. The drill assembly attachment of claim 1, wherein the input mechanism and output mechanism further comprise a shaft having an input shaft end and an output shaft end.

4. The drill assembly attachment of claim 1, wherein the input mechanism further comprises an input shaft and the output mechanism further comprises a separate output shaft.

5. The drill assembly attachment of claim 4, wherein the input mechanism is configured to rotate at a first rotational speed and the output mechanism is configured to rotate at a second rotational speed.

6. The drill assembly attachment of claim 5, wherein the first rotational speed is greater than the second rotational speed.

7. The drill assembly attachment of claim 6, wherein the ratio of the first rotational speed to the second rotational speed is at least 2 to 1.

8. The drill assembly attachment of claim 1, wherein the input mechanism further comprises an input shaft connected to an input wheel and the output mechanism further comprises an output shaft connected to an output wheel.

9. The drill assembly attachment of claim 8, further comprising an idler mechanism having an idler wheel and wherein the idler wheel is operably coupled to the input wheel and the output wheel.

10. The drill assembly attachment of claim 8, further comprising wherein the input wheel and output wheel are disposed inside of a drive box.

11. The drill assembly attachment of claim 10, wherein the drive box is connected to one or more of the mounting member and the handle.

12. The drill assembly attachment of claim 8, wherein the input wheel and the output wheel further comprise gears or sprockets.

13. The drill assembly attachment of claim 12, wherein the input wheel is operably coupled to the output wheel via one or more of a gear drive system, a belt drive system and a chain drive system.

14. The drill assembly attachment of claim 1, wherein the power drill assembly mount is adjustable to accommodate power drill assemblies of different sizes.

15. The drill assembly attachment of claim 1, wherein the throttle is adjustable to accommodate power drill assemblies of different sizes.

16. The drill assembly attachment of claim 1, wherein the output mechanism is configured to receive a rotatable device.

17. The drill assembly attachment of claim 16, wherein the output mechanism further comprises at least a first output shaft that extends directly from the input mechanism and a separate second output shaft.

18. The drill assembly attachment of claim 17, wherein the input mechanism is configured to output a first level of torque via the first output shaft and is configured to output a higher second level of torque via the second output shaft.

19. The drill assembly attachment of claim 1, further comprising a bearing assembly configured to facilitate rotation of the input mechanism.

20. The drill assembly attachment of claim 1, further comprising a bearing assembly configured to facilitate rotation of the output mechanism.

21. The drill assembly attachment of claim 1, wherein the throttle is in adjustable communication with one or more of the power drill assembly mount and the handle.

22. A method of using a power drill assembly with a drill assembly attachment, the power drill assembly having a handle and a trigger, the drill assembly attachment having a handle having two handle gripping portions being parallel and laterally spaced apart, a power drill assembly mount further comprising a base plate positioned between and extending laterally toward the laterally spaced apart two handle gripping portions and being connected to the handle of the drill assembly attachment, with the power drill assembly mount further having a power drill assembly handle connector that includes a side plate connected to and extending upward from the base plate and at least one bracket connected to the side plate, wherein the at least one bracket is configured to connect the power drill assembly to the side plate, an adjustable throttle having a user engaging portion proximate one of the two handle gripping portions and a trigger engaging portion proximate the trigger of the power drill assembly when the power drill assembly is connected to the power drill assembly mount, a drive assembly having an input mechanism that is rotatably driven by the power drill assembly when the power drill assembly is connected to the power drill assembly mount and an output mechanism in operative communication with the input mechanism, the method comprising:

connecting a first portion of the power drill assembly to the input mechanism;

connecting the handle of the power drill assembly to the side plate of the power drill assembly mount of the drill assembly attachment; and engaging the adjustable throttle of the drill assembly attachment with a trigger of the power drill assembly to rotate the input mechanism and effect rotation of the output mechanism.

23. The method of claim 22, wherein the input mechanism and output mechanism further comprise a shaft having an input shaft end and an output shaft end.

24. The method of claim 22, wherein the input mechanism further comprises an input shaft connected to an input wheel and the output mechanism further comprises an output shaft connected to an output wheel, and the input wheel and output wheel further comprise gears or sprockets.

25. The method of claim 24, wherein the input wheel is operably coupled to the output wheel via one or more of a gear drive system, a belt drive system and a chain drive system.

26. The method of claim 22, further comprising connecting a rotatable device to the output mechanism.

27. The method of claim 26, wherein the rotatable device is an auger.

28. The method of claim 22, wherein the output mechanism of the drill assembly attachment further comprises more than one output shaft.

29. The method of claim 28, wherein each output shaft is configured to receive a rotatable device.

30. The method of claim 28, wherein each output shaft is configured to provide a different level of torque.

* * * * *